US008260133B2

(12) United States Patent
Li et al.

(10) Patent No.: US 8,260,133 B2
(45) Date of Patent: Sep. 4, 2012

(54) STANDBY RESTORATION SIGNALING FOR OPTICAL NETWORKS

(75) Inventors: Guangzhi Li, Madison, NJ (US); Angela Lan Chiu, Holmdel, NJ (US); Robert Duncan Doverspike, Tinton Falls, NJ (US); John L. Strand, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 428 days.

(21) Appl. No.: 12/584,414

(22) Filed: Sep. 4, 2009

(65) Prior Publication Data

US 2010/0067899 A1    Mar. 18, 2010

Related U.S. Application Data

(60) Provisional application No. 61/191,829, filed on Sep. 12, 2008.

(51) Int. Cl.
*H04J 1/16* (2006.01)
*H04J 3/14* (2006.01)
*H04J 14/00* (2006.01)

(52) U.S. Cl. ........... 398/45; 398/42; 398/43; 398/44; 370/227; 370/228; 370/225; 370/226; 370/241; 370/248; 370/216; 370/406; 714/1; 714/2; 714/100

(58) Field of Classification Search ............... 398/42–45
See application file for complete search history.

(56) References Cited

U.S. PATENT DOCUMENTS

| 6,018,576 | A | * | 1/2000 | Croslin | 379/22.03 |
| 6,970,417 | B1 | * | 11/2005 | Doverspike et al. | 370/216 |
| 7,088,676 | B1 | | 8/2006 | Doverspike et al. | |
| 2009/0232492 | A1 | * | 9/2009 | Blair et al. | 398/5 |

OTHER PUBLICATIONS

Li [Resilience Design in All optical ULH Networks].*
Robert D. Doverspike; "Fast Restoration in a Mesh Network of Optical Cross-Connects"; Proceedings of Optical Fiber Conference (OFC'99), San Diego, CA, Feb. 1999.
John Strand, et al.; "Realizing the Advantages of Optical Reconfigurability and Restoration With Integrated Optical Cross-Connects"; Journal of Lightwave Technology, vol. 21, No. 11, Nov. 2003.
Angela L. Chiu, et al.; "Economic Benefits of Transparent OXC Networks As Compared to Long Systems With OADM's"; OFC, pp. 411-412, Atlanta, Mar. 2003.
Guangzhi Li, et al.; "Resilience Design in All-Optical ULH Networks", Journal of Optical Networks, 2006.
Jane M. Simmons, Network Design in Realistic "All-Optical" Backbone Networks; IEEE Communications Magazine, vol. 44, No. 11, Nov. 2006.
Bruce G. Cortez, "The Emerging Intelligent Optical Network: Now a Reality"; OFC 2002.
Aleksandra Boskovic, et al. "Broadcast and Select OADM Nodes: Application and Performance Trade-offs" OFC, TuX2, pp. 158-159, Anaheim, Mar. 2002.

* cited by examiner

*Primary Examiner* — Shi K Li
*Assistant Examiner* — Oommen Jacob

(57) ABSTRACT

Systems and methods are described that provide a distributed restoration signaling protocol for shared mesh restoration with standbys for transparent optical networks.

21 Claims, 15 Drawing Sheets

STANDBY RESTORATION SIGNALING FOR OPTICAL NETWORKS

CROSS REFERENCE TO RELATED APPLICATIONS

This application claims the benefit of U.S. Provisional Application No. 61/191,829, filed on Sep. 12, 2008, the disclosure which is incorporated herein by reference in its entirety.

BACKGROUND OF THE INVENTION

The invention relates generally to network communications. More specifically, the invention relates to systems and methods that provide a distributed restoration signaling protocol for mesh optical networks, including opaque, transparent, and translucent Optical cross-Connects (OXCs).

An OXC is used to switch high-speed optical signals in a fiber optic network. There are several implementations of OXCs. One is implemented in the electronic domain. All the input optical signals are converted into electronic signals using optical transponders after they are demultiplexed. The electronic signals are then switched by an electronic switch module. Finally, the switched electronic signals are converted back into optical signals using optical transponders again, and then the resulting optical signals are multiplexed by optical multiplexers onto output fibers. This is known as Optical-Electrical-Optical (OEO) switching.

OXCs based on OEO switching limit the maximum bandwidth of the signal due to their electronic circuits. OEO switching is also expensive due to the number of optical transponders. One advantage is that the optical signals are regenerated, so they leave the OXC free of dispersion and attenuation. An electronic OXC is also called an opaque OXC.

Switching optical signals in an all-optical device is the second implementation. Such a switch is called a transparent OXC. Optical signals are demultiplexed, and then the demultiplexed wavelengths are switched by optical switch modules. After switching, the optical signals are multiplexed onto output fibers by optical multiplexers. This switch architecture keeps the data rate and data contents transparent. Because the signals are kept in the optical format, the transparent OXC architecture does not allow easy optical signal quality monitoring.

In an opaque optical network, an optical signal service connection is terminated at each hop along its path and is regenerated for the next hop. A connection is an end-to-end signal path where one end is an ingress OXC and the other end is an egress OXC. Opaque optical networks do not have wavelength continuity constraint issues and each OXC provides wavelength conversion automatically, allowing conversion from one wavelength to another. However, opaque OXCs and interfaces are more expensive.

In contrast, in a transparent optical network, an optical signal service connection is not terminated at each hop along its path, meaning that each link OXC does not provide wavelength conversion. The wavelengths assigned to a service connection must remain the same throughout the whole path providing wavelength continuity. Transparent optical networks have lower cost interfaces, floor space and power requirements as compared with opaque optical networks.

Due to the physical nature of optical fiber, an optical signal has to be regenerated after a predetermined fiber distance to prevent signal degradation that cannot be restored. This distance limit is called "optical-reach." An optical signal is able to travel a relatively long distance without requiring OEO regeneration, such that the signal is able to travel multiple hops throughout the optical network. A regenerator is required when a service connection length equals its optical-reach. Signal regeneration may also be used in the service connection if a different wavelength must be assigned even if the path length is within its optical-reach. Since regenerators are expensive, the number of regenerators are optimized (minimized) when provisioning an optical service connection and its restoration.

A compromise between opaque and transparent OXCs is a translucent OXC. Translucent OXCs include a switch stage which comprises an optical switch module and an electronic switch module. Optical signals passing through the switch stage can be switched either by the optical switch module or the electronic switch module. In most cases, the optical switch module is preferred for the purpose of transparency. When the optical switch module's switching interfaces are all busy or an optical signal needs signal regeneration through OEO conversion, the electronic module is used. Translucent OXCs provide a compromise of full optical signal transparency and comprehensive optical signal monitoring. It also provides the possibility of signal regeneration at each OXC. Embodiments focus on transparent OXCs with regenerators, which is a special case of a translucent OXC.

Ultra Long Haul (ULH) technologies for Dense Wavelength Division Multiplexing (DWDM) transports are being deployed due to their high-capacity and capital savings. A first generation ULH network typically includes a set of point-to-point linear systems with each linear system having two terminals. Between the two terminals, there may be one or more Reconfigurable Optical Add-Drop Multiplexers (ROADMs) where traffic may be added or dropped, or expressed through optically by degree-2 ROADMs.

Using these ULH systems, a wavelength connection is able to travel a long distance such as 1,500 km or more without requiring OEO regeneration. A connection using the same wavelength without OEO regeneration is referred as a lightpath. An OEO regenerator is needed when a lightpath length equals its optical-reach. When a connection has to travel through two linear ULH systems, an OEO regenerator is also needed even if its length is within its optical-reach. Since the OEO regenerators are expensive devices, first generation ULH networks were not inexpensive. They also complicate dynamic reconfiguration and restoration in the optical network.

To reduce the cost of OEO regeneration and enable automatic reconfigurability and dynamic restoration via wavelength switching and tuning, next generation optical networks are moving toward an all-optical mesh network. These configurations convert the terminals and degree-2 ROADMs to higher-degree ROADMs to switch and route wavelengths optically, which are known as Photonic cross-Connects (PXCs).

Both IP and wavelength services have stringent quality requirements for their high priority traffic. One requirement is resiliency against network failures that include performing a sub-second restoration for high priority traffic that has experienced a single failure, and for a small percentage of mission critical traffic, the ability to restore after experiencing multiple failures.

Unlike opaque optical networks, where OEO conversion occurs in the signal path at all OXCs, a transparent ULH network OXC does not have OEO conversion/regeneration functions and the signal path may require OEO regenerators for some OXCs.

Shared mesh restoration has been used in opaque optical networks where all restoration channels on each link are pre-reserved and each OXC has wavelength conversion capability. When a failure is detected, a pre-planned restoration path will be dynamically established by cross-connecting any available channel on each link along the pre-planned restoration path. U.S. Pat. No. 6,970,417 B1 (assigned to the assignee of the present invention) discloses shared mesh restoration for opaque optical networks wherein the restoration methods and systems include error detection at the add/drop ports of network nodes. However, in a transparent optical network, the OXC itself does not have wavelength conversion capability and opaque optical network shared mesh restoration schemes cannot be applied to transparent optical networks directly. Therefore, shared mesh restoration with standbys restoration scheme may be used in transparent optical networks. Here a standby means one or more pre-configured lightpaths with the same optical path and different wavelengths for network restoration. Then a restoration path can be configured through a series of restoration standbys via regenerators.

In shared mesh restoration with standbys, each OXC includes a pool of OEO regenerators. However, they are not dedicated to a specific restoration path prior to a failure. Instead, depending on the failure, they dynamically are tuned and pointed appropriately so that they are able to establish a restoration path. In this case, the regenerators are shared among multiple restoration paths.

The challenge in reliable optical network design is to provide fast restoration in conjunction with restoration capacity in a cost effective manner. A robust and fast distributed restoration signaling protocol for mesh transparent optical networks is needed.

SUMMARY OF THE INVENTION

The inventors have discovered that it would be desirable to have systems and methods that provide a distributed restoration signaling protocol for shared mesh restoration with standbys for transparent optical networks.

Embodiments provide a standby restoration signaling protocol for transparent optical networks. This restoration signaling protocol has two embodiments: one-ended restoration signaling protocol and two-ended restoration signaling protocol. Each service connection has two end OXCs where traffic is added/dropped from the transparent optical network. One-end signaling means only the pre-specified end OXC initiates the restoration process while two-end signaling means that both end OXCs of the service path initiate the restoration process and these two restoration messages meet in the middle of the restoration path.

One aspect of the invention provides a method for a restoration signaling protocol for restoring service to a service path between an ingress end Optical cross-Connect (OXC) and an egress end OXC over a restoration path in a mesh network, which is referred to as one-ended restoration signaling. Methods according to this aspect of the invention include configuring an ingress end OXC to egress end OXC restoration path for the service path when the service path is provisioned, configuring restoration standbys for the restoration path wherein a restoration standby has one lightpath and each lightpath is assigned one wavelength channel, storing the restoration path at the ingress end and egress end OXCs, choosing a control OXC for the restoration path which may be the ingress end OXC or the egress end OXC defining an opposite end OXC, detecting a service path failure, initiating service path restoration comprising accessing the restoration path at the control OXC, issuing a disconnect command at the control OXC disconnecting a client add/drop port from the service path wavelength channel, issuing a cross-connect command at the control OXC cross-connecting the client add/drop port for the service path to a first restoration standby wavelength channel, sending an X-connect message on the restoration path from the control OXC to a first restoration path regenerator OXC containing the first restoration standby wavelength channel, if the first regenerator OXC is not at the opposite end OXC, selecting a second restoration standby wavelength channel, issuing a cross-connect command cross-connecting the first restoration standby wavelength channel to the second restoration standby wavelength channel, and forwarding an X-connect message to a next regenerator OXC on the restoration path containing the second restoration standby wavelength channel, if the first regenerator OXC is at the opposite end OXC, issuing a disconnect command disconnecting a client add/drop port from the service path wavelength channel, and issuing a cross-connect command cross-connecting the first restoration standby wavelength channel to the client add/drop port at the opposite end OXC.

Another aspect of the invention provides a method for a restoration signaling protocol for restoring service to a service path between an ingress end OXC and an egress end OXC over a restoration path in a mesh network from both the ingress end OXC and the egress end OXC, which is referred as two-ended restoration signaling. Methods according to this aspect of the invention include configuring an ingress end OXC to egress end OXC restoration path for the service path when the service path is provisioned, configuring restoration standbys for the restoration path wherein a restoration standby has one lightpath and each lightpath is assigned one wavelength channel, storing the restoration path at the ingress end and egress end OXCs, detecting a service path failure, initiating service path restoration comprising accessing the ingress end OXC to egress end OXC restoration path at the ingress end and egress end OXCs, issuing a disconnect command at the ingress end OXC disconnecting a client add/drop port from the wavelength channel of the service path, issuing a disconnect command at the egress end OXC disconnecting a client add/drop port from the wavelength channel of the service path, for each restoration standby, determining which OXC in a restoration standby is master and which OXC in the same restoration standby is slave, wherein the master OXC selects a restoration standby wavelength channel and the slave may suggest a restoration standby channel where the slave suggested wavelength channel may be overwritten by the master OXC, sending an X-connect message on the restoration path from the ingress end OXC to a first restoration path regenerator OXC containing a first restoration standby wherein if the ingress end OXC is the master of the first restoration standby, issuing a cross-connect command cross-connecting the client add/drop port to the first restoration standby wavelength channel, sending an X-connect message on the restoration path from the egress end OXC to a last restoration path regenerator OXC containing a last restoration standby wherein if the egress end OXC is the master of the last restoration standby, issuing a cross-connect command cross-connecting the client add/drop port to the last restoration standby wavelength channel, determining if the receiving regenerator OXC is master or slave, if master: selecting one wavelength channel for the previous restoration standby and sending a Channel-Ack message to the slave OXC of the previous restoration standby with the selected wavelength channel, if slave: accepting the wavelength channel for the previous restoration standby, if the receiving regenerator OXC has received an X-connect message from a next restoration standby, the two restoration processes have met, wherein the receiving OXC issues a cross-connect command cross-connecting the wavelength channel for the received restoration standby to the wavelength channel for the next restoration standby, if the receiving regenerator OXC has not received an X-connect message from a next restoration standby, determining if the receiving OXC is the master or the slave for the next restoration standby and if the receiving OXC is the master, selecting one wavelength channel for the next restoration standby and sending an X-connect message with the selected wavelength channel to the next (slave) regenerator OXC, issuing a cross-connect command cross-connecting the wavelength channel for the previous restoration standby to the selected wavelength channel for the next restoration standby, if a slave regenerator OXC: sending an X-connect message with one empty or one suggested wavelength channel to a next (master) regenerator OXC, waiting for a Channel-Ack message from the next master regenerator OXC, receiving a Channel-Ack message from the next master regenerator OXC, accepting the wavelength channel from the Channel-Ack message, and issuing a cross-connect command to cross-connect the wavelength channel for the previous restoration standby to the wavelength channel for the next restoration standby, if the X-connect message receiving OXC is the egress end OXC of the restoration path, issuing a disconnect command disconnecting a client port from the service path wavelength channel, and issuing a cross-connect command to cross-connect the wavelength channel for the previous restoration standby with the client add/drop port.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
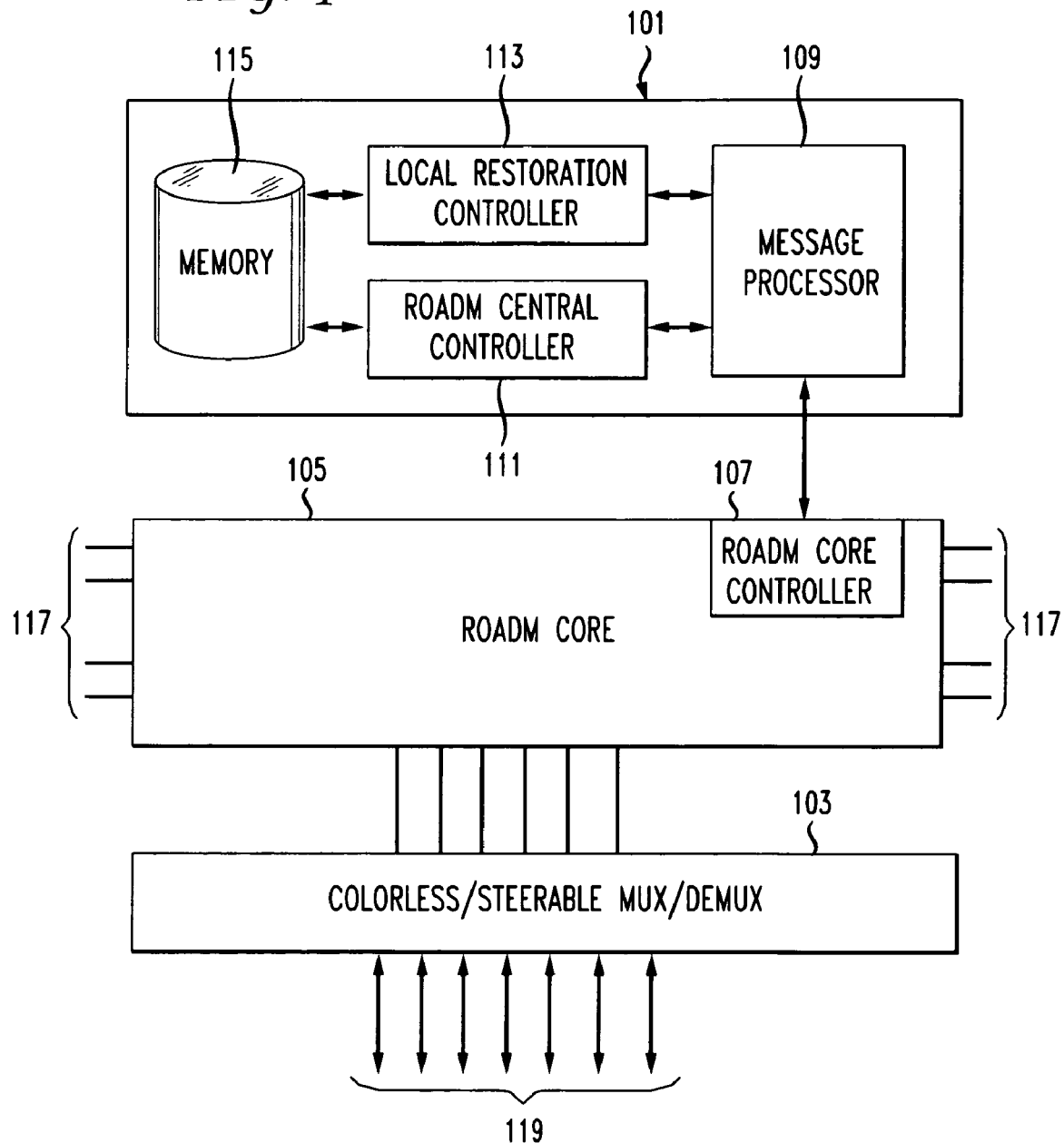
FIG. 1 is an exemplary Optical cross-Connect (OXC).

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions for a distributed restoration signaling protocol for mesh optical networks. Mesh networks are any network without topology constrains. The application code for execution can reside on a plurality of different types of computer readable media known to those skilled in the art.

Restoration standbys are pre-established lightpaths providing connectivity between switching OXCs having a fiber link of degree-2 or higher. A lightpath is a common wavelength channel that may cross one or more network links having a total distance not more than the Optical-reach. Each lightpath has one wavelength. One standby is a set of lightpaths with the same physical path but different wavelengths. A network link is a pair of fibers between two network OXCs where each fiber in a pair is directional. Each fiber pair has a fixed amount of wavelengths or channels.

The next generation of transparent core optical networks includes ROADM-based network OXCs interconnected by multi-wavelength fiber links that include optical amplifiers (OAs) or In-Line Amplifiers (ILAs) arranged in a mesh topology. The OXCs are typically multi-degree ROADMs with wavelength blocking and/or wavelength switching capability. The optical network also provides network operators a way to dynamically drop, add and pass-through wavelengths at network OXCs.

Figure 2:
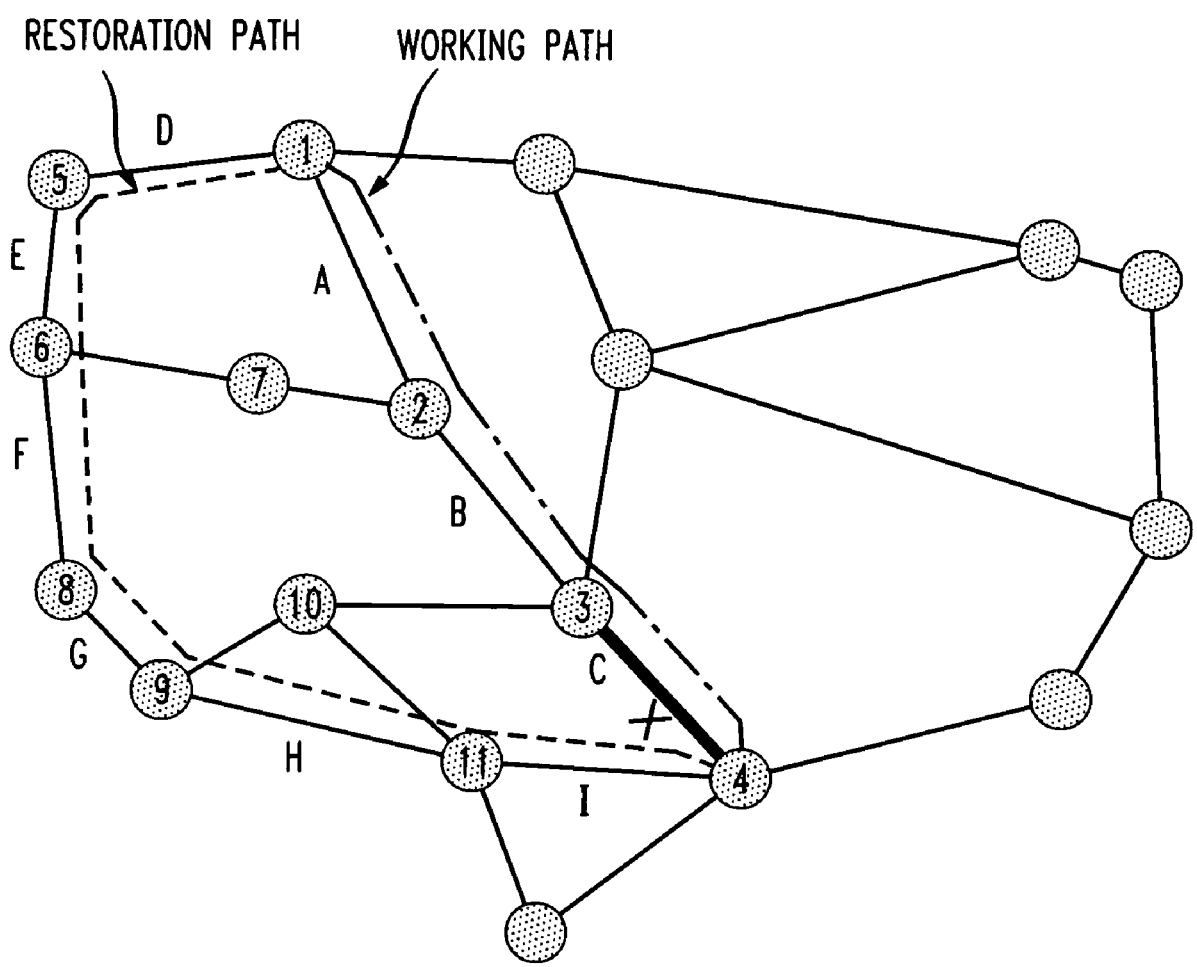
FIG. 2 is an exemplary optical network showing a service lightpath and its restoration lightpath to teach the optical network restoration method.
Figure 3:
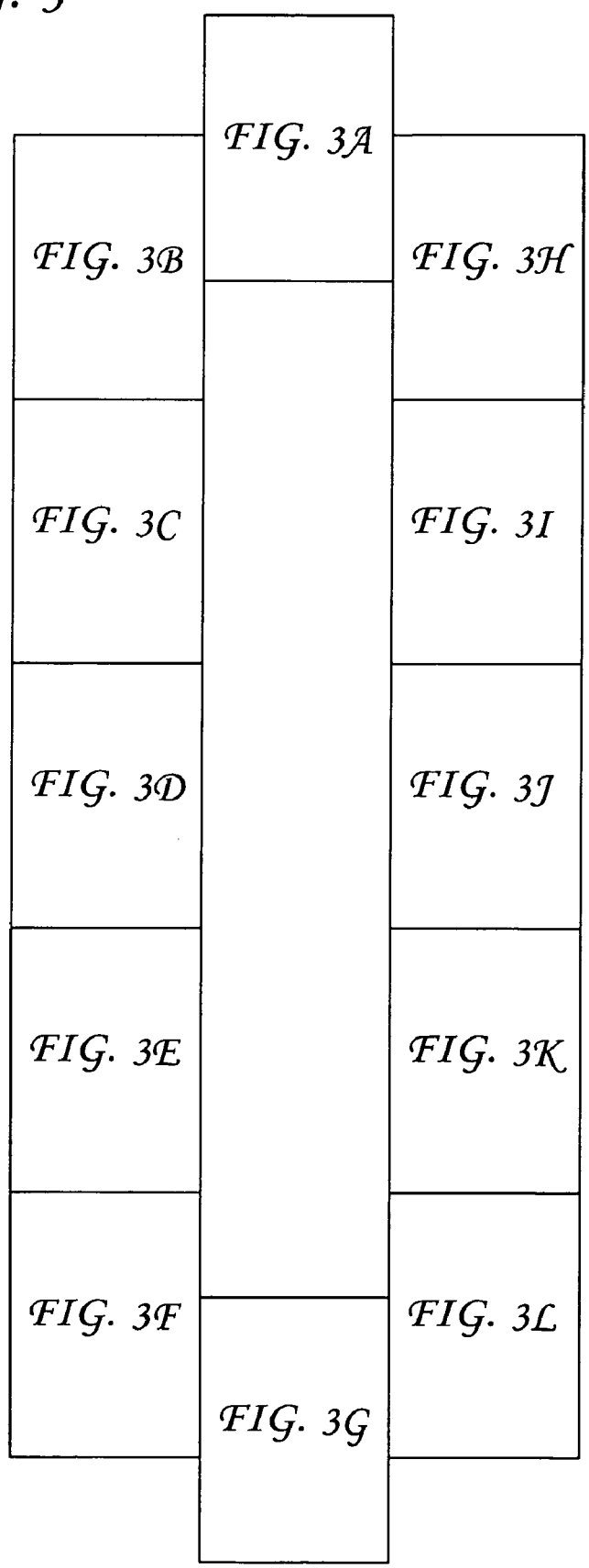
FIG. 3 is an exemplary method for one-ended and two-ended restoration path signaling protocol.
Figure 3A:
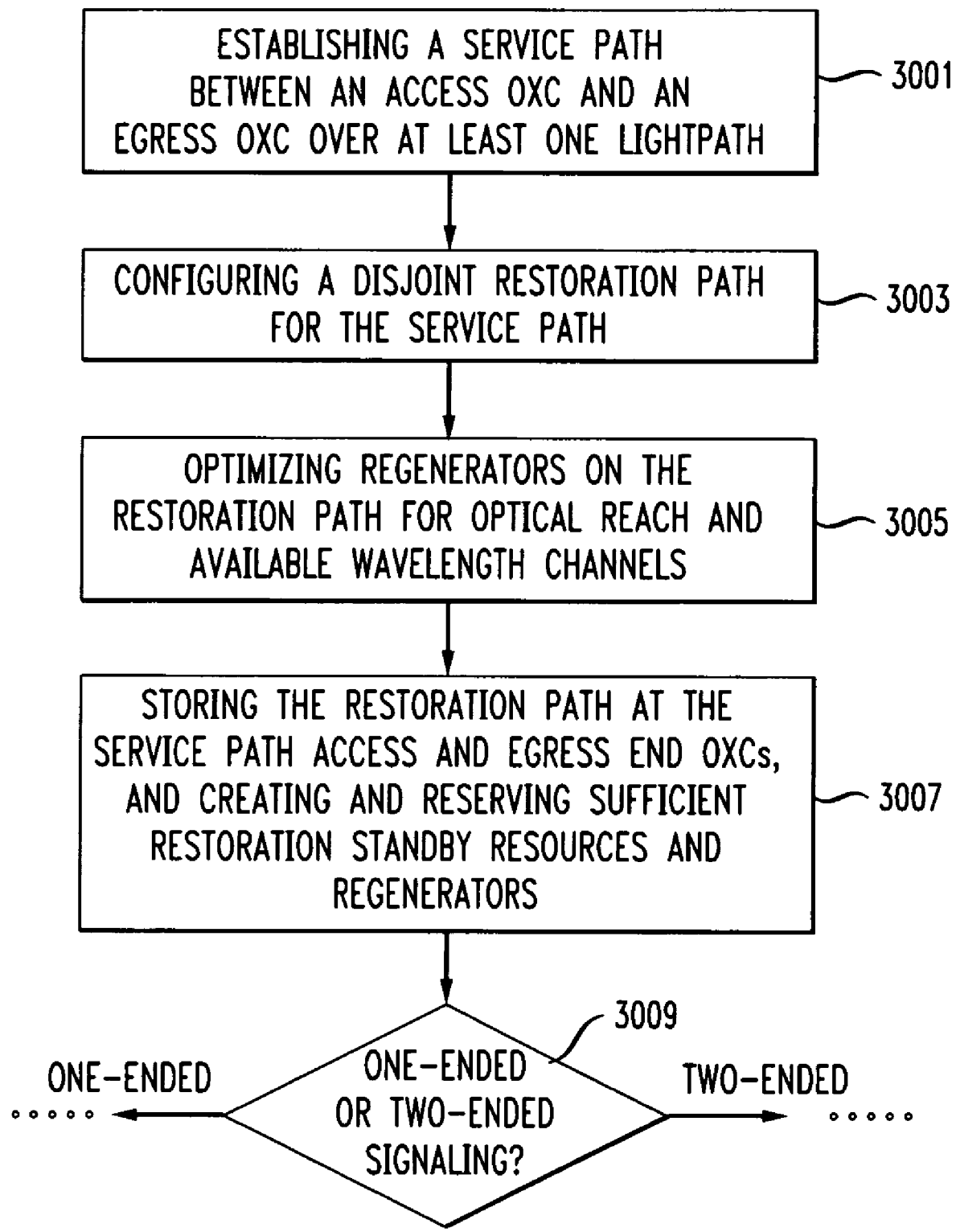
Figure 3B:
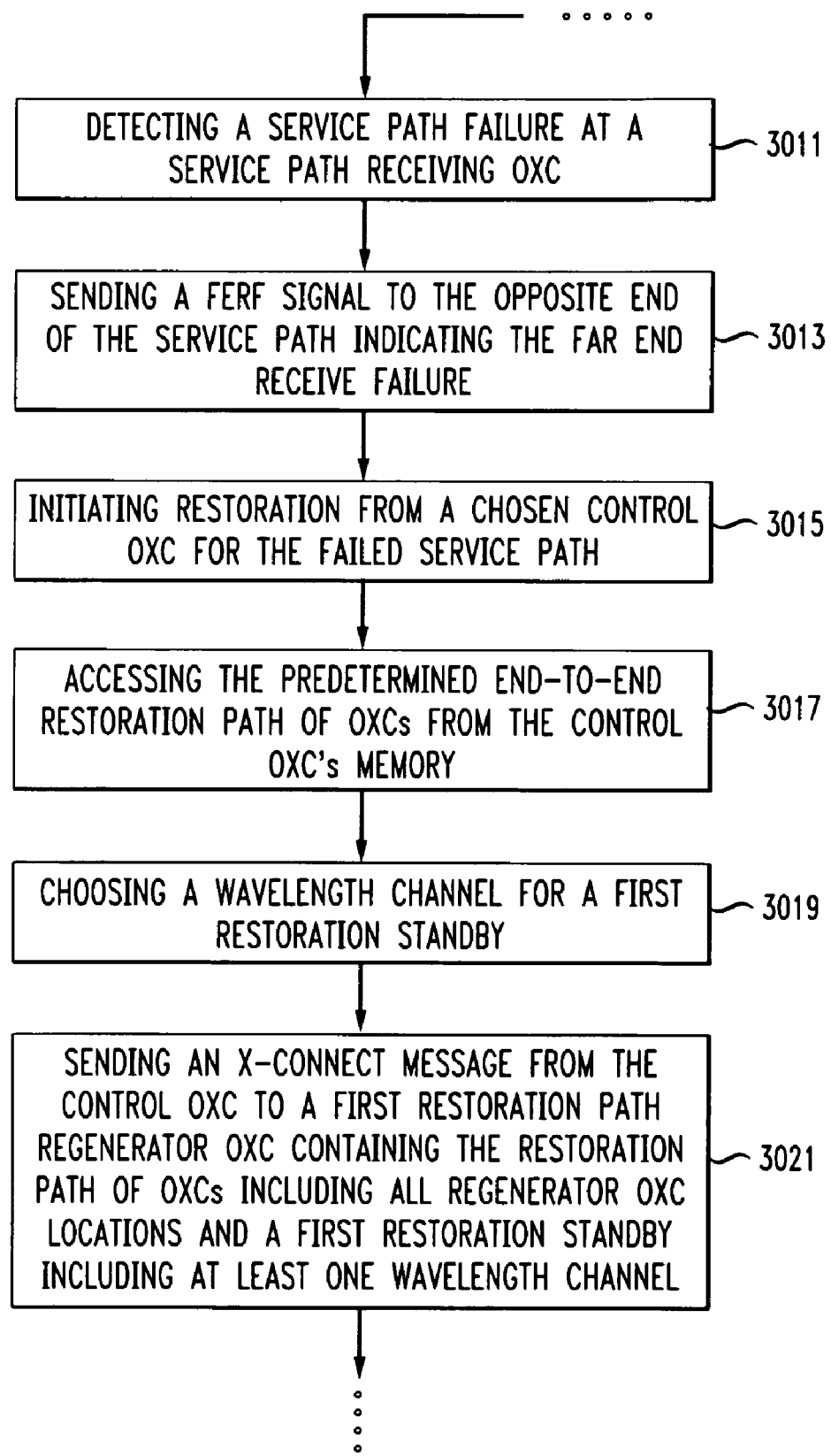
Figure 3C:
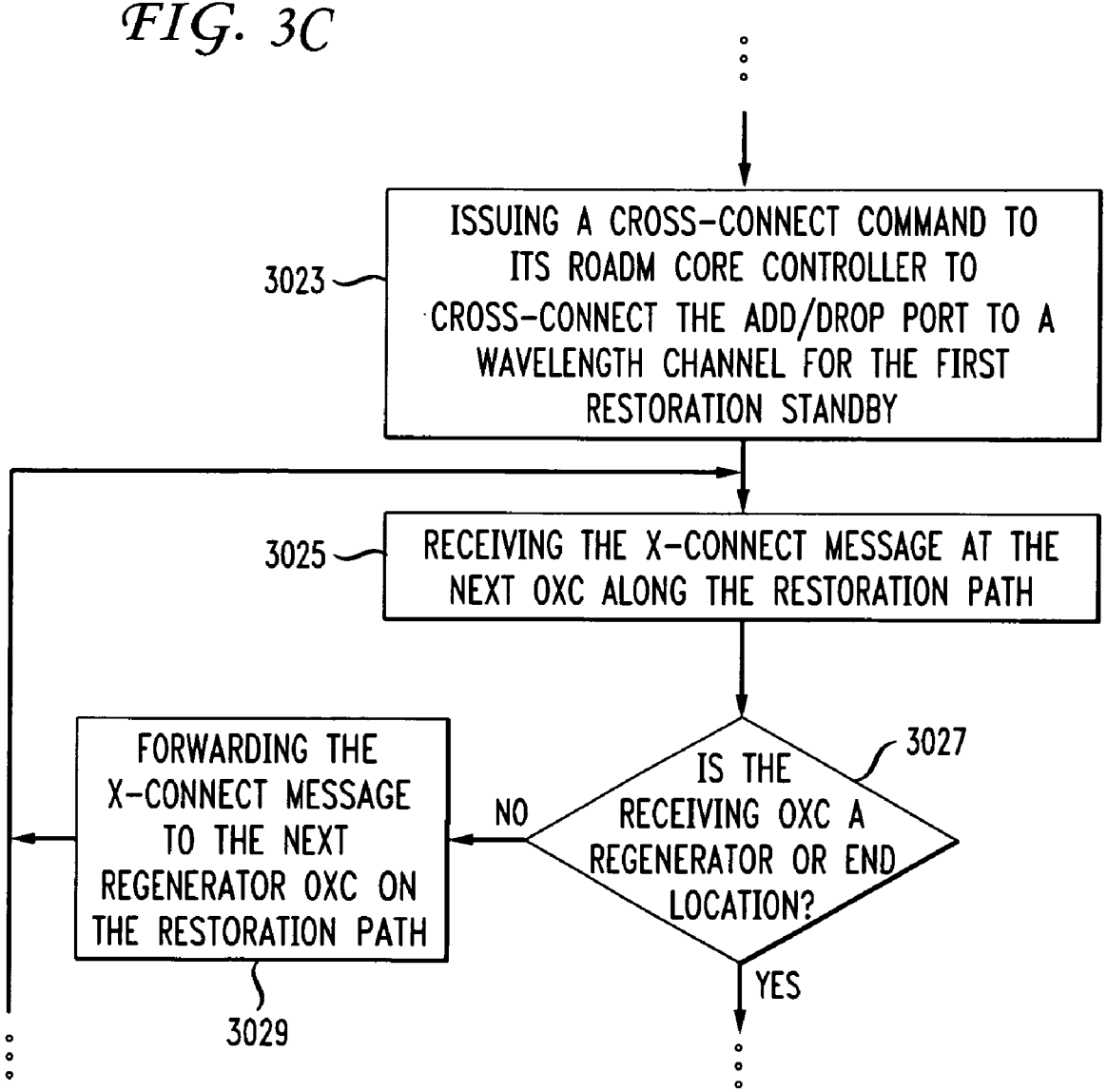
Figure 3D:
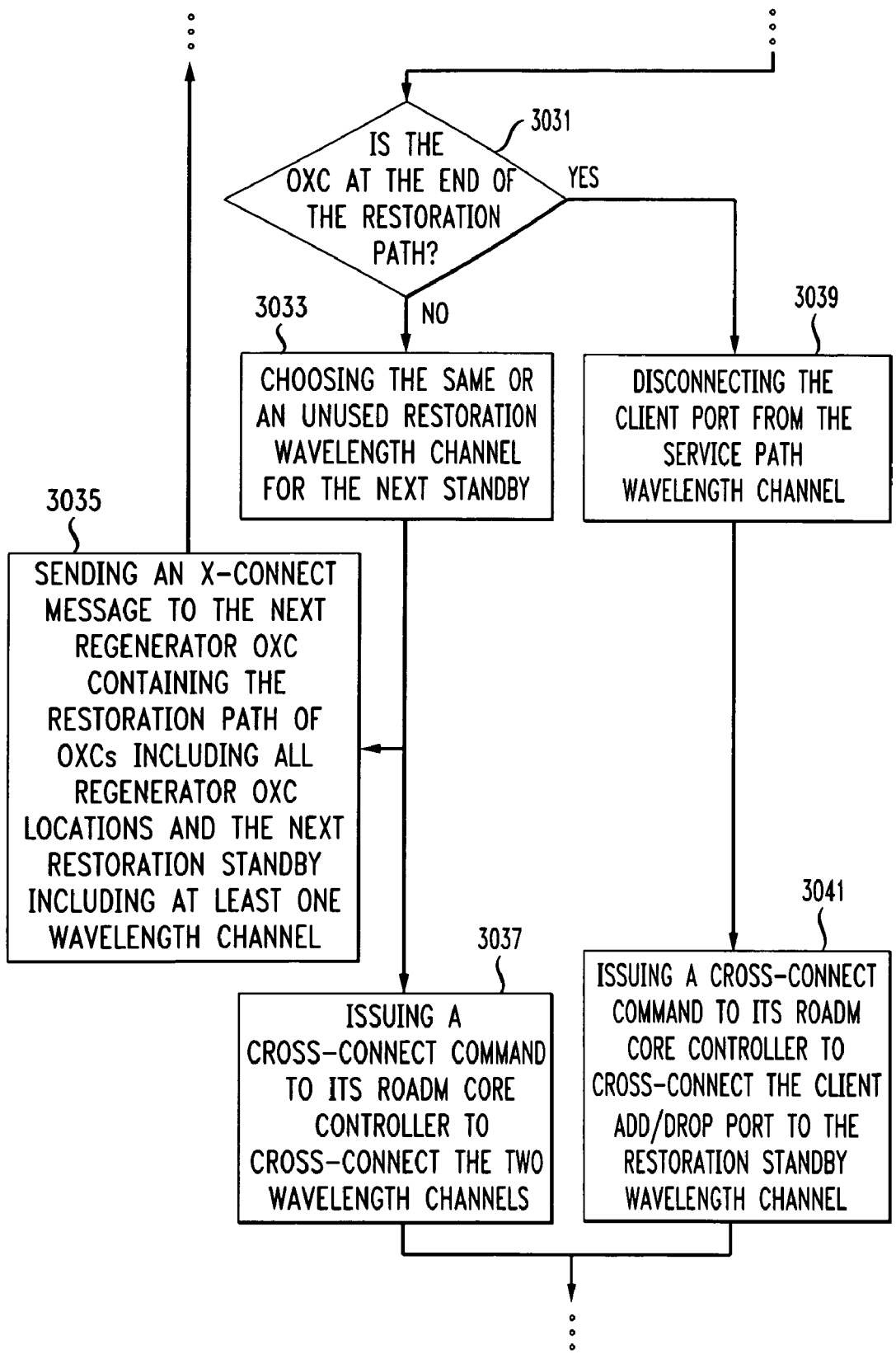
Figure 3E:
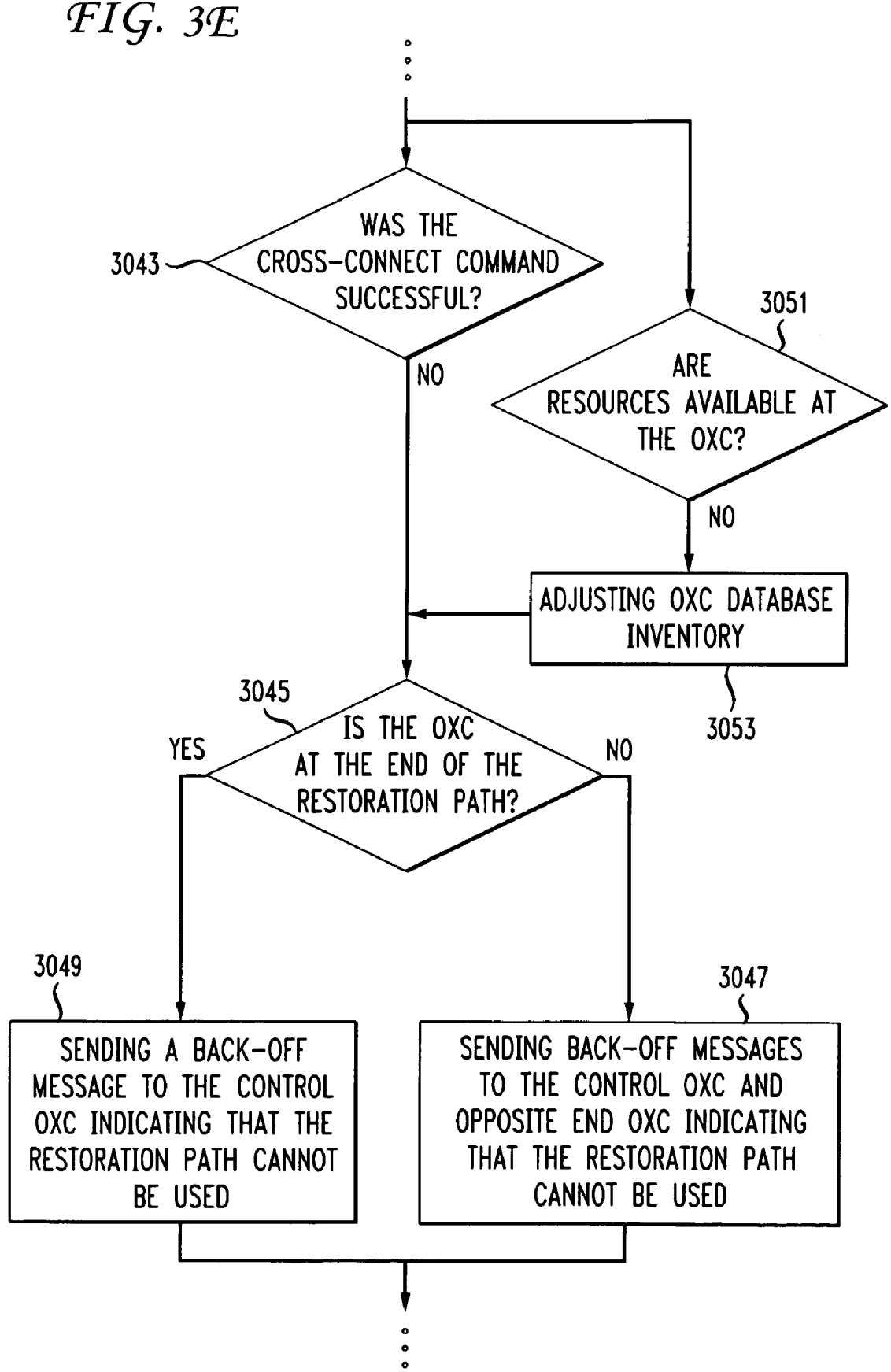
Figure 3F:
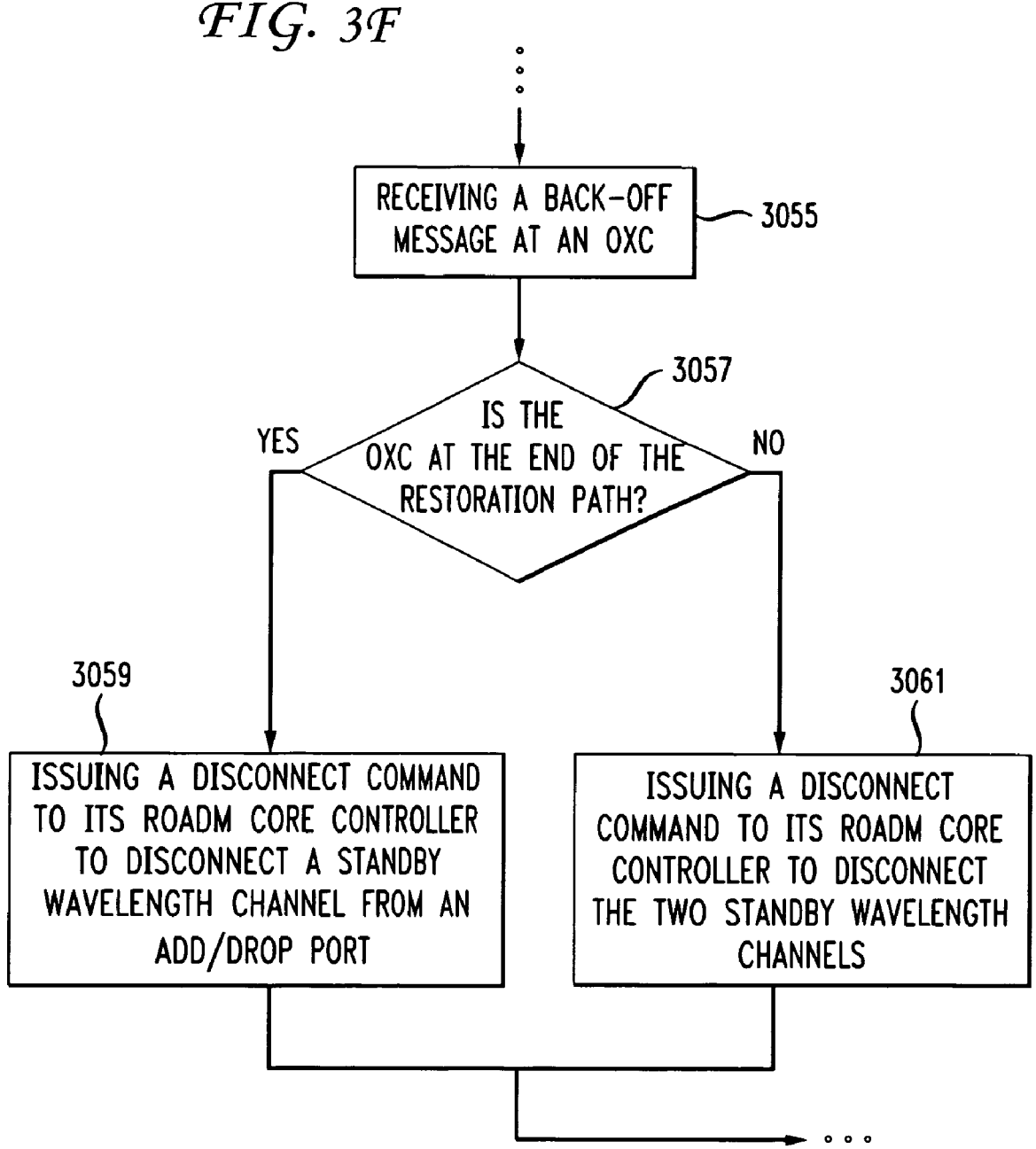
Figure 3G:
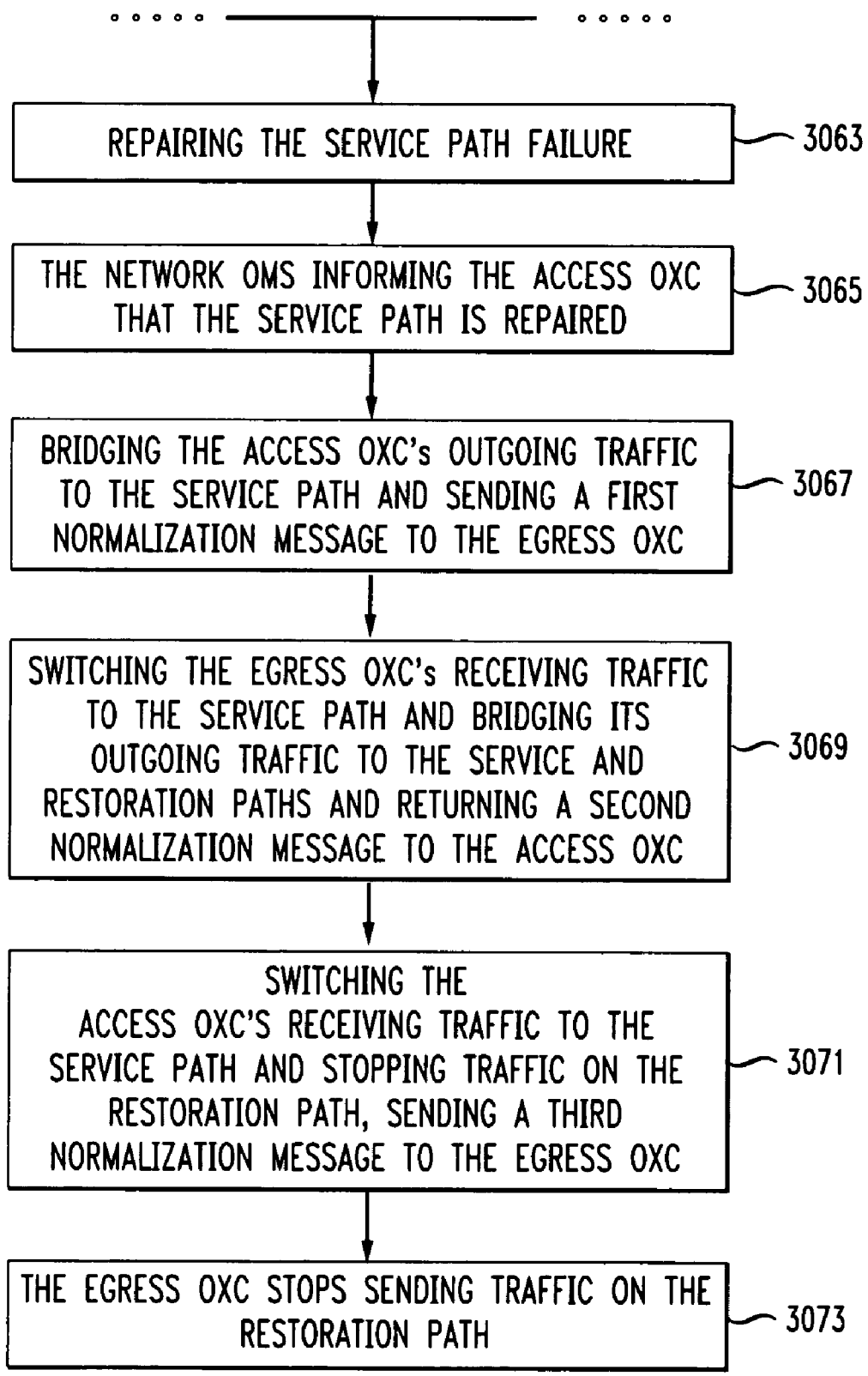
Figure 3H:
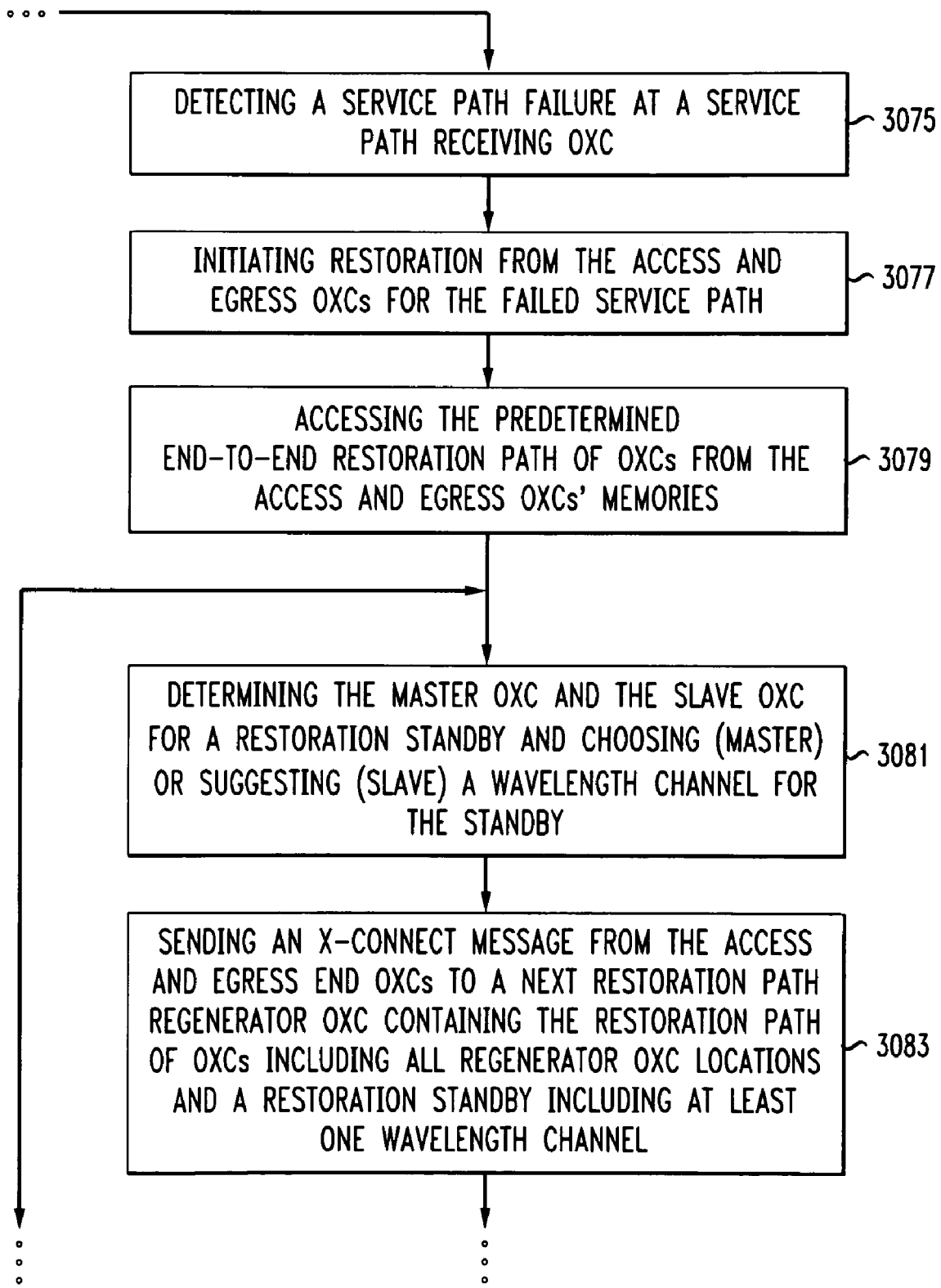
Figure 31:
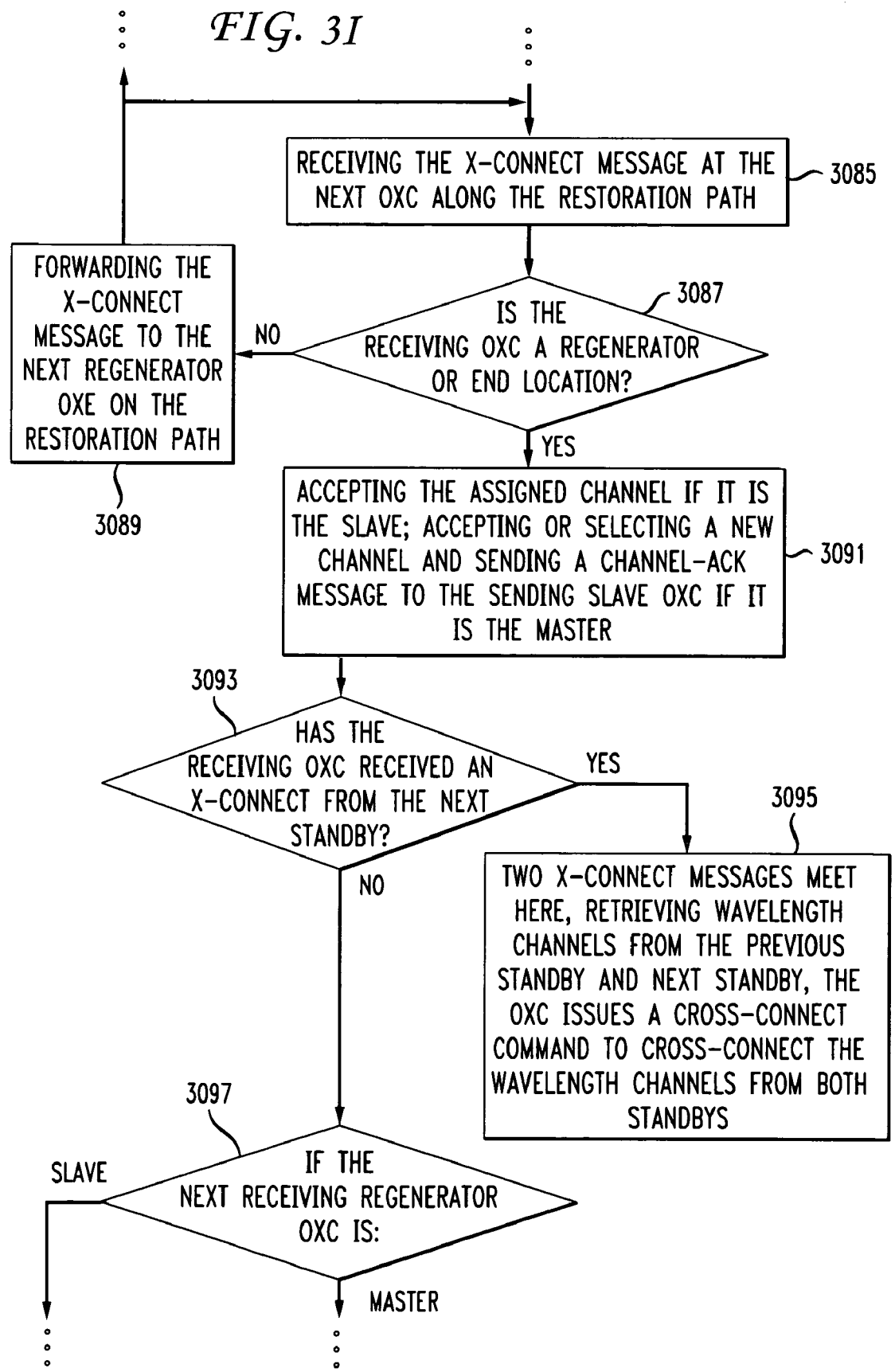
Figure 3J:
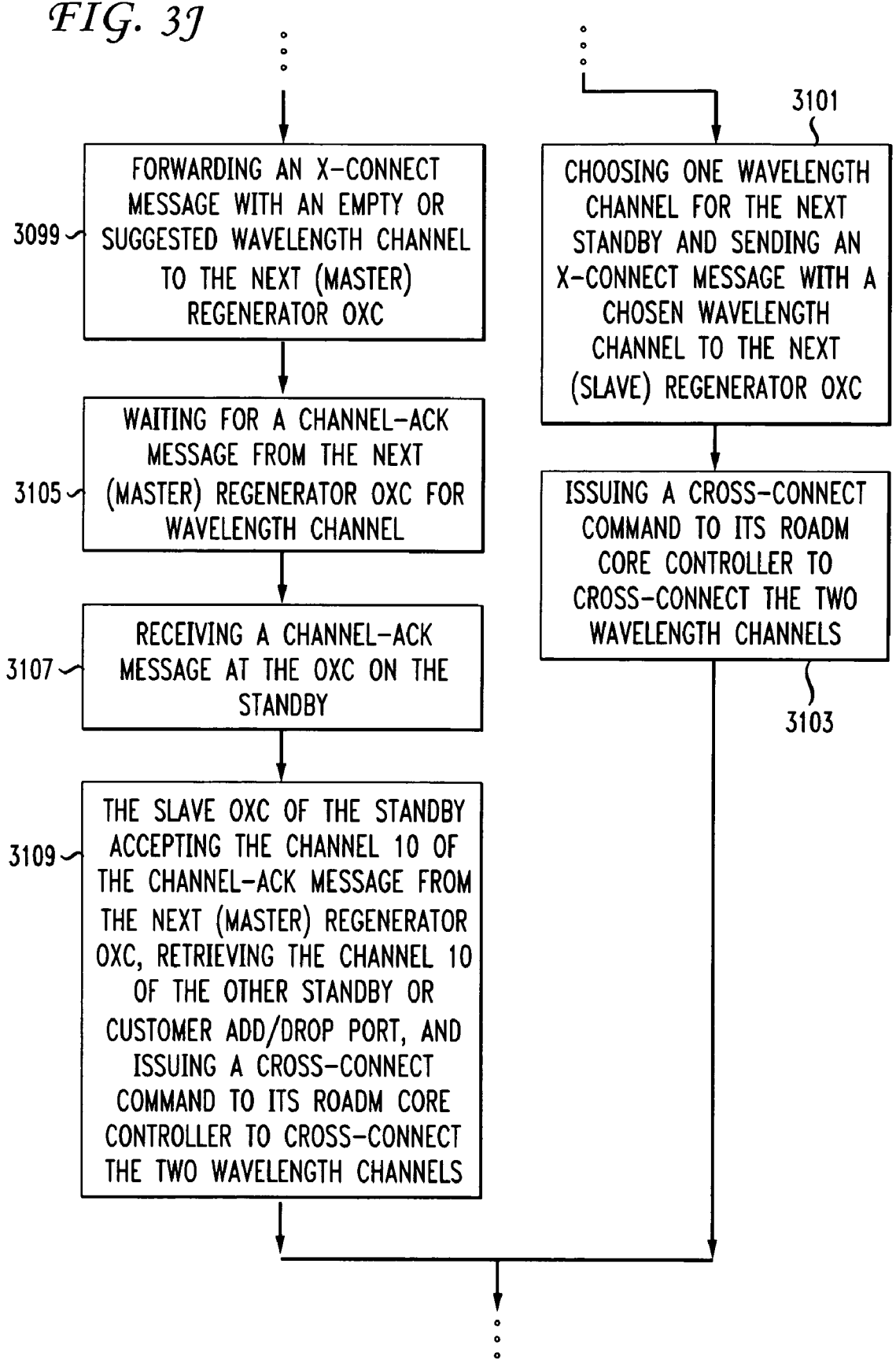
Figure 3K:
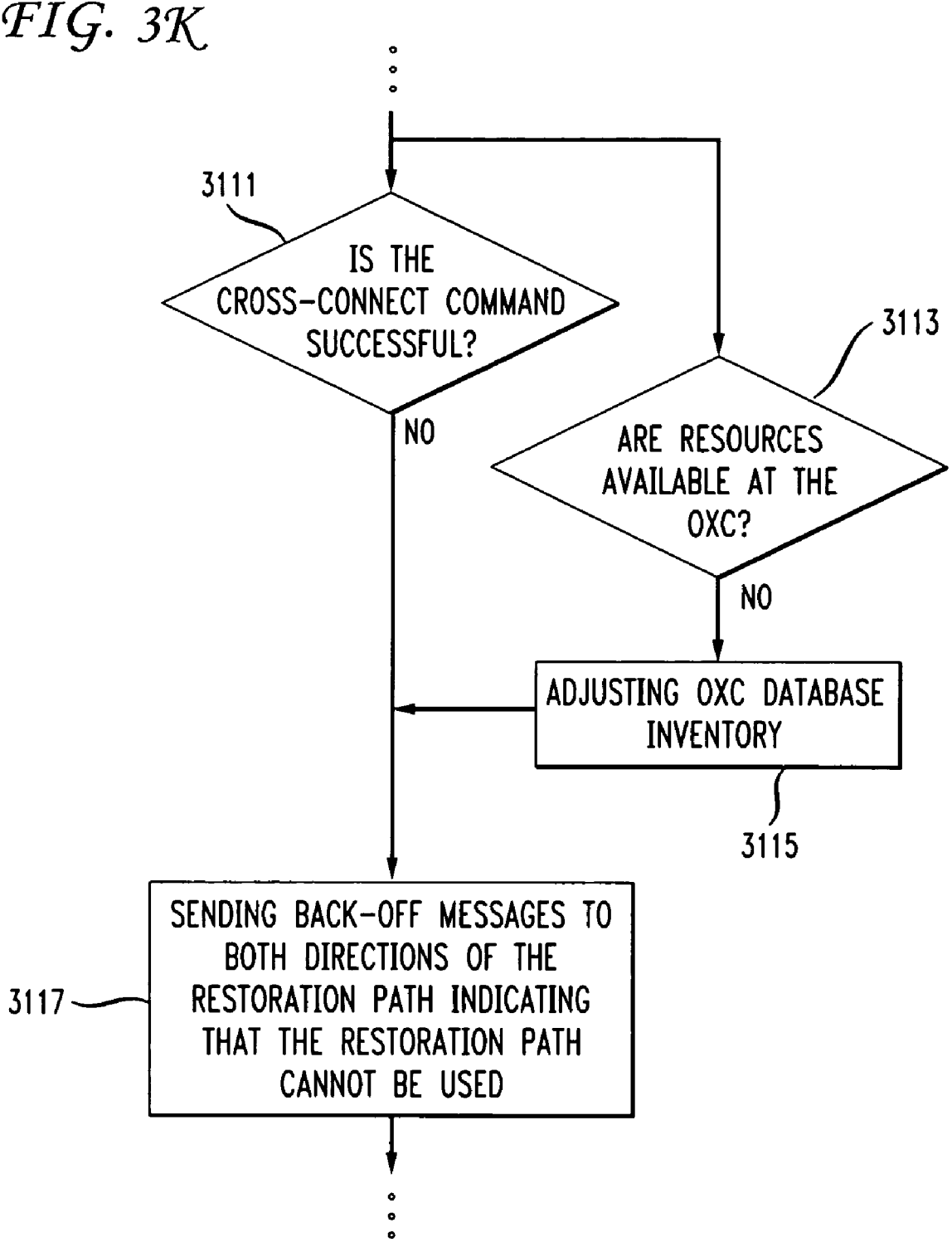
Figure 3L:
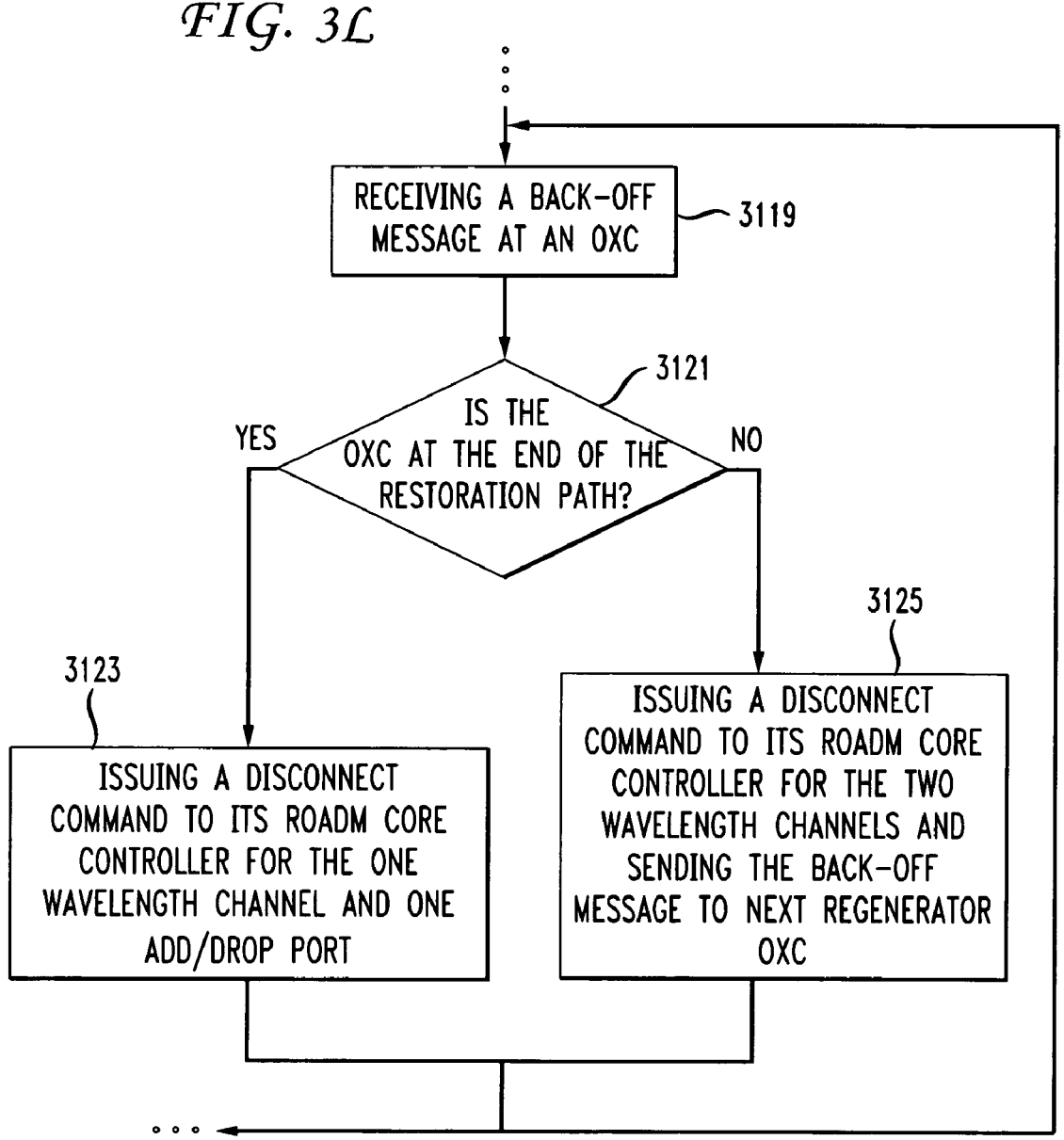

FIG. 1 shows an OXC 101 according to one embodiment. Other OXC architectures with similar functions may also be used to practice the restoration signaling protocol. FIG. 2 shows a service path and its restoration path in a mesh optical network. FIG. 3 shows an overall method for one- and two-ended restoration signaling protocol.

The OXC 101 comprises a colorless/steerable multiplexer/demultiplexer 103; a ROADM core 105 which includes optical components; a ROADM core controller 107 which performs physical operations such as cross-connection, disconnection, wavelength adding/dropping etc.; a message processor 109 which receives, processes and delivers all messages; a ROADM central controller 111 which controls the intelligence of the ROADM core 105 such as network topology collection, service path selection, ROADM core operation control, etc.; a Local Restoration Controller (LRC) 113 which performs the restoration signaling protocol; a database/memory 115 which installs network resources and other information such as service paths, restoration paths, link wavelengths, standby wavelengths, etc.; network ports 117 which connect to other ROADMs, and add/drop ports 119 which connect to clients and regenerators. The OXC 101 embodiment may be applied to other OXC architectures as long as the basic functions exist.

The OXC 101 comprises several stages: the colorless/steerable multiplexer/demultiplexer 103, the ROADM core 105 for reconfiguring paths 117 and the set of ports 119 for adding and dropping traffic signals. The optical demultiplexer 103 separates wavelengths in an input fiber 117 onto ports 119. The reconfiguration may be achieved, for example, by optical switches which direct the wavelengths to the optical multiplexer 103 or to drop ports 119. The optical multiplexer 103 multiplexes the wavelength channels that are to continue on from demultiplexer ports with those from the add ports, onto a single output fiber.

All lightpaths that directly pass through an OXC are called pass-through lightpaths, while those that are added or dropped are called added/dropped lightpaths to the OXC. The ROADM core controller 107 allows the optical switches to be reconfigured dynamically via signaling protocols.

OXC embodiments 101 employ dedicated LRCS 113. Each OXC 101 has a function module LRC 113. Each LRC 113 is connected to the message processor 109 which directly connects to the ROADM core controller 107 by a high-speed network management interface that bypasses the usual interfaces for connection and fault management. The OXC LRC 113 performs restoration cross-connect commands. LRCS 113 communicate with each other using a reliable message transport protocol.

Each OXC 101 has a control plane and a data plane. The control plane performs all of the intelligence and the data plane cross-connects wavelengths. All data is transmitted in the data plane. Restoration path messages are transmitted between control planes. There are four messages. However, the control plane has to communicate with the data plane inside each OXC which necessitates two executable commands for OXCs 101: cross-connect <x,y> and disconnect <x,y>. The cross-connect <x,y> command may succeed or fail depending on the OXC status at the time.

FIG. 2 shows a service path comprising link A (OXC 1 to OXC 2), link B (OXC 2 to OXC 3) and link C (OXC 3 to OXC 4) (step 3001). An OXC disjoint restoration path for the service path is derived over link D (OXC 1 to OXC 5), link E (OXC 5 to OXC 6), link F (OXC 6 to OXC 8), link G (OXC 8 to OXC 9), link H (OXC 9 to OXC 11) and link I (OXC 11 to OXC 4) (step 3003). A fiber cut is shown on link C. Due to a transparent optical network reachability matrix as well as OXC 101 regenerator availability, the restoration path may require optical signal regeneration at OXC 6 and OXC 9 forming restoration standbys OXC 1 to OXC 6, OXC 6 to OXC 9 and OXC 9 to OXC 4. A transparent optical network reachability matrix describes all possible paths without requiring OEO regeneration.

When OXC 1 receives a connection request from OXC 1 to OXC 4 with a restoration requirement, OXC 1 retrieves the optical network topology and network resources from its memory 115. Its ROADM central controller 111 selects the service path OXC 1, OXC 2, OXC 3, and OXC 4 with an assigned wavelength on links A, B and C, which may be the same or change during the path depending on optical reach. All of the information is stored in the memory 115 of the ingress and egress OXCs. Afterwards, service path signaling protocol will be applied to establish the connection. At the same time, OXC 1's LRC 113 will retrieve all information on the network and the service path. LRC 113 will compute a restoration path which is diverse from the service path, such as OXC 1, OXC 5, OXC 6, OXC 8, OXC 9, OXC 11 and OXC 4, defining links D, E, F, G, H and I with signal regeneration at OXC 6 and OXC 9, where links D and E form restoration standby OXC 1 to OXC 6, links F and G form restoration standby OXC 6 to OXC 9 and links H and I form restoration standby OXC 9 to OXC 4. The three restoration standbys either are created through previous service connections, or need to be created using whatever available methods are provided by the network Operation Management System (OMS). The required restoration standby wavelength channel (s) and restoration regenerators need to be reserved before a service path failure using whatever available methods are provided by the network OMS. For two-ended restoration signaling, the restoration path, restoration standbys and reserved restoration regenerators will be informed to the other end of the connection, i.e., OXC 4.

The restoration path identifies the OXCs 101 and OXCs 101 where regeneration is needed establishing restoration standbys over one or more OXCs 101. All OXCs 101 along the restoration path are traversed optically unless regeneration is needed, for example, at OXC 6 and OXC 9 (steps 3005, 3007).

Embodiments perform an end-to-end restoration path signaling method where the restoration paths do not vary per service path failure events. Restoration path signaling variants include one- and two-ended signaling.

In one-ended restoration path signaling, one specific service path end OXC (OXC 1 or OXC 4) may initiate restoration signaling. In two-ended restoration path signaling, both service path ingress and egress end OXCs for a service connection initiate restoration signaling (OXC 1 and OXC 4) to reduce restoration time.

For one-ended restoration signaling, when link C fails, both OXC 1 and OXC 4 will detect a loss of light or a loss of frame. Since OXC 1 is the pre-determined restoration OXC, it will initiate restoration signaling on the restoration path. The first reserved regenerator OXC is OXC 6. OXC 1 will select one wavelength channel ID, for example channel x, on restoration standby OXC 1 to OXC 6 over restoration path links D and E and forward a restoration message to OXC 6, at the same time, OXC 1 sends a cross-connect command to its ROADM core controller to cross-connect channel x with the client add/drop port. When OXC 6 receives the restoration message, it will look to the second regeneration OXC, which is OXC 9. OXC 6 will select a wavelength channel ID, for example channel y, on restoration standby OXC 6 to OXC 9 over restoration path links F and G and forward the restoration message to OXC 9. At the same time OXC 6 sends a cross-connect command to its ROADM core controller indicating the two wavelength channels <x,y>. The ROADM core controller will use a regenerator to cross-connect the two wavelength channels <x,y>. When OXC 9 receives the restoration message, it will look at the restoration path and find out that the third restoration standby is OXC 9 to OXC 4 over restoration path links H and I. OXC 9 will select one wavelength channel ID, for example channel z, on restoration standby OXC 9 to OXC 4 and forward the restoration message to OXC 4. At the same time OXC 9 sends a cross-connect command to its ROADM core controller indicating the two wavelength channels <y,z>. The ROADM core controller will use a regenerator to cross-connect the two wavelength channels <y,z>. When OXC 4 receives the restoration message with wavelength channel z, it will cross-connect channel z to the client add/drop port to finish the restoration path. For one-ended restoration signaling, in order to avoid wavelength channel contention, i.e., both ends of one restoration standby select the same wavelength channel. Embodiments may implement that lower OXC IDs select a wavelength channel having the lowest available channel ID and higher OXC IDs select a wavelength channel having the highest available channel ID.

In both one- and two-ended restoration signaling, restoration signaling messages are transmitted on the restoration path. At OXC 101 locations on the restoration path where regeneration is predetermined, an OXC 101 LRC 113 chooses wavelength channel assignments for cross-connection from its inventory 115 of spare wavelength channels that have been reserved for restoration. The required spare wavelength channel inventory at each OXC 101 is performed by the management plane or other methods and is beyond the scope of this disclosure, and ensures that sufficient capacity is available for a failure. This inventory is shared. A wavelength channel from an OXC 101 inventory 115 may be used for another failure.

Fault detection is confined to the mesh optical network connection ingress and egress OXCs 101. Therefore, a more detailed fault isolation to determine the failure location is not required for restoration signaling protocol and this task is beyond the scope of this disclosure.

The wavelength channel ID concept uniquely identifies a wavelength channel lightpath, from one OXC 101 to another over one or more links. Each wavelength channel lightpath (standby) has two end terminal OXCs 101. For example, the wavelength channel lightpath that has terminations OXC 2 and OXC 3 only traverses link B. The wavelength channel lightpath that has terminations OXC 1 and OXC 6 traverses restoration links D and E. Each termination OXC 101 associates a channel ID with its own port, wavelength ID, and other end termination OXC 101. Therefore, when an OXC 101 passes a channel ID to another OXC 101 along a link or standby, the receiving OXC 101 can identify its own port and wavelength ID for the transmitted channel ID. The identification scheme for wavelength channels may pair the two directions of travel into one channel ID.

Each OXC 101 LRC 113 maintains a database/memory 115. For each connection, the ingress and egress OXCs' LRC 113 maintains a connection ID, the service path listing all OXCs, regeneration OXC locations, wavelengths of each inter-OXC links, predetermined restoration paths and restoration priority, and restoration regenerators of OXCs for the restoration path.

For both one- and two-ended restoration path signaling embodiments, restoration path signaling includes the following messages: X-connect, Back-off and Normalization. Two-ended restoration path signaling adds a Channel-Ack message. The message set is transported over a reliable transport protocol that performs checksum and/or other content quality checks.

The X-connect message includes a message identification (ID), a connection ID, a restoration path listing all disjoint restoration OXCs, restoration path regenerator OXCs, the sending OXC ID, the receiving OXC ID, the wavelength channel ID, the number of hops from a previous regenerator OXC, the distance from a previous regenerator OXC, the restoration priority and error information.

The Back-off message includes a connection ID, a restoration path listing all restoration OXCs, restoration path regeneration location OXCs, the sending OXC ID, the receiving OXC ID, the wavelength channel ID and error information.

The Channel-Ack (wavelength channel acknowledgement) message includes a connection ID, the sending OXC ID, the receiving OXC ID and the wavelength channel ID.

The Normalization message includes a connection ID, the sending OXC ID, the receiving OXC ID and error information.

Embodiments are optimized since sufficient capacity has been reserved to reroute service path connections that have failed. When spare capacity is not available, the remainder of the restoration process will operate slower, treating restoration as a new service provision, referred to as re-provisioning restoration after the initial process has stabilized. This is an intentional objective to be competitive with existing self-healing methods and achieves the fastest restoration times possible under available capacity constraint assumptions.

The first embodiment is one-ended restoration path signaling (step 3009). This embodiment chooses either the ingress or egress end OXC 101 (OXC 1 or OXC 4) of a service path as a control OXC 101. For example, OXC 1 is the control OXC in FIG. 2. If the service path experiences a fiber cut or an inter-OXC failure, the control OXC, OXC 1, will detect the failure via a loss of light or a loss of frame. If the failure is a one-way failure from OXC 1 to OXC 4, only the receiving end OXC, OXC 4, of the failure can detect the failure. If the receiving end OXC is the control OXC, it will initiate the restoration method, otherwise, a Far End Receive Failure (FERF) alarm or other mechanism where the end OXC that detects the "receive" signal failure issues an alarm to the path other end OXC over Synchronous Optical Network (SONET) overhead or other protocol of the constituent connection signal to trigger restoration. If OXC 4 is not the control OXC, OXC 4 would send a FERF alarm to OXC 1, and OXC 1 will initiate restoration. The service path end OXC 101 that controls initiates restoration after it acknowledges a service path failure. Unused, available wavelength channels along the restoration path are chosen bidirectionally even for a one-way failure, and predetermined regenerator OXCs along the restoration path send cross-connect commands to their ROADM core controllers with chosen wavelength channels to establish the restoration path. Connections are typically bidirectional. Failure restoration is bidirectional even if the detected failure is unidirectional.

An OXC add/drop port 119 detects a failure via Alarm Indication Signal (AIS) Line (AIS-L), or Path (AIS-P), loss of signal, loss of frame, etc., or performance threshold crossing of a connection. When a receiving OXC detects a path failure, it will issue a Far End Receive Failure (FERF) alarm to the other end OXC of the connection path. If the failure is a two-way failure, for example, link C, the FERF alarm will not reach the other end OXC of the path, but both end OXCs, OXC 1 and OXC 4 will detect the failure. If the failure is a one-way failure, the FERF alarm will reach the other end OXC of the path. Either way, the control OXC add/drop port 119 will detect the failure and forward the failure alarm to its message processor 109, and the message processor 109 will assign the alarm to its LRC 113 (steps 3011, 3013).

The control OXC 101 LRC 113 determines each failed connection ID, and retrieves the restoration priority, path and regeneration locations for each failed service path connection from the OXC's memory 115 and initiates restoration for each failed service path (steps 3015, 3017).

The control OXC LRC 113 of the failed service path knows the predetermined restoration path regenerator OXC location (s) and accesses its database of bi-directional available restoration wavelength channels for the next standby lightpath in the restoration path and chooses one (step 3019). The method to choose a wavelength channel for the restoration path involves issues of wavelength contention and regenerator optimization during restoration method. For one-ended signaling, it is desired to use the lower OXC ID of the two end OXCs for each restoration standby when choosing a wavelength channel from low to high and the higher OXC ID of the two end OXCs for each standby when choosing a wavelength channel from high to low. However, if under optical-reach constraints, an OXC may choose the same wavelength as before to avoid regenerator requirement.

The control OXC 101 or a regenerator OXC 101 may issue an X-connect message to the next regenerator OXC 101 on the restoration path after choosing a restoration wavelength channel. The control OXC 101 LRC 113 performs the following: 1) it sends an X-connect message that contains, among other data, the restoration path of OXCs including all regenerator OXC locations and the chosen wavelength channel ID in the restoration path up to the next regenerator OXC location (step 3021), and 2) it sends a cross-connect command to its ROADM core controller 107 to cross-connect the add/drop ports or previous wavelength channel to the chosen wavelength channel for the next standby (step 3023). If the OXC is either the ingress or egress end OXC, it cross-connects the add/drop port 119 to the selected restoration wavelength channel. If the OXC is a regenerator OXC, it cross-connects the wavelength channel of the previous restoration standby with the wavelength channel of the next restoration standby at a regenerator OXC location.

A cross-connect command is different from an X-connect message. An X-connect message is for subsequent regenerator OXCs in a restoration path and a cross-connect command is for an end OXC or a regenerator OXC to perform a physical cross-connect action inside the OXC. In two-ended restoration path signaling, each restoration standby has two end OXCs, where one OXC is pre-chosen as a master OXC and the other is pre-chosen as a slave OXC to avoid wavelength contention. To forward an X-connect message, a slave OXC does not choose a wavelength channel ID, but forwards an X-connect message with an empty channel or a suggested channel ID. Upon receipt of an X-connect message by a master OXC from a slave OXC, the master OXC chooses a wavelength channel ID and forwards a Channel-Ack message that contains the chosen wavelength channel ID back to the slave OXC.

After an OXC issues a cross-connect command to its ROADM core controller 107, it does not have to wait for a cross-connect command confirmation from its ROADM core controller 107 in order to forward an X-connect message to its next OXC location on the restoration path.

For a given restoration path, an OXC 101 LRC 113 that receives an X-connect message (step 3025) performs the following.

If the receiving OXC 101 is not a predetermined regenerator OXC location or is at the end of the restoration path, the LRC 113 passes the X-connect message to the next OXC on the restoration path (steps 3027, 3029).

If the receiving OXC 101 is a predetermined regenerator location, the LRC 113 accepts the chosen wavelength channel ID in the X-connect message and chooses the same or an unused wavelength channel for the next restoration standby to the next OXC in the restoration path (steps 3031, 3033). The receiving OXC LRC 113 forwards the X-connect message to the next OXC location (step 3035) and issues a cross-connect command to its ROADM core controller 107 to cross-connect the two chosen wavelength channels (step 3037).

If the receiving OXC 101 is the egress end OXC, it may be necessary for the LRC 113 to first issue a disconnect command to its ROADM core controller 107 to take down the existing service path connection from the client add/drop port to its service path wavelength channel (steps 3031, 3039), then issue a cross-connect command to its ROADM core controller 107 to cross-connect the client add/drop port to its restoration path wavelength channel ID (step 3041).

Because the X-connect message was forwarded to the next OXC in the restoration path without waiting for the cross-connect confirmation (step 3035), in case a cross-connect command failed due to physical component failures, software bugs, etc., its ROADM core controller 107 forwards Back-off messages in both directions if it is not at the end of the restoration path (steps 3043, 3045, 3047) or to the control OXC direction (steps 3043, 3045, 3049) to remove the established restoration path.

If a restoration path regenerator OXC 101 LRC 113 receives an X-connect message and it does not have either a spare regenerator or spare restoration wavelength channel for the next regenerator OXC location according to its database, it sends a Back-off message to both directions of the restoration path. After receiving the Back-off message, the OXC at the regenerator location of the end of the path issues disconnect commands and the LRC 113 also adjusts its database inventory according to the X-connect and Back-off messages (steps 3051, 3053).

If an OXC 101 receives a Back-off message in response to its X-connect message for one connection, and if it is neither the egress OXC nor a restoration path regenerator location, it passes the message to the next OXC (step 3055). If the OXC 101 receiving a Back-off message in response to its X-connect message is the egress OXC or a restoration path regenerator OXC, it finds the wavelength channels to which the connection is assigned on both side standbys or just one standby if at the end of the restoration path and its LRC 113 issues a disconnect command to its ROADM core controller 107 for those two wavelength channels (or one wavelength channel and one add/drop port if at the end OXC) (steps 3057, 3059, 3061). The Back-off message removes all consumed resources for the entire restoration path. The connection ingress OXC, OXC 1, will wait for a certain time and use re-provisioning restoration to restore all restoration failed connections.

After the restoration method stabilizes, another wave of restoration, such as re-provisioning may be initiated to connect all unrestored connections. Each service connection through the OXC network is diagnosed and handled individually and independently of other connections so normalization does not need to be coordinated across the repair process or among other connections.

The normalization phase is performed while the service path is still cross-connected at all of its OXCs. That is, when a failure occurred, it was rerouted onto a sequence of restoration wavelength channels by the restoration method over its restoration path. These restoration wavelength channels are exclusive of the service path wavelength channels and, as such, the service path wavelength channels should be unaffected except at the ingress and egress OXCs of each service connection.

After the service path is repaired (step 3063), the ingress OXC 101 will be informed by the network OMS and trigger Normalization. Alternatively, the ingress and egress ends of the service connection may randomly test the health of the service path, and when the service path is repaired, the ingress OXC 101 will trigger Normalization (step 3065). Normalization is performed using a bridge and roll scheme. Since the restoration path is in service, the ingress OXC also bridges its outgoing traffic to the service path (now repaired) and sends the first Normalization message with bridge-roll information to the egress OXC (step 3067) on the restoration path. After the egress OXC receives the Normalization message, it switches its receiving traffic to the service path and bridges its outgoing traffic to both the service and restoration paths. At the same time, the egress OXC returns a second Normalization message to the ingress OXC with bridge-roll information (step 3069) on the restoration path. After the ingress OXC receives the Normalization message from the egress OXC, it switches its receiving traffic to the service path and stops sending traffic on the restoration path. The ingress OXC then sends a third Normalization message to the egress OXC on the service path (step 3071). After the egress OXC receives the third Normalization message, it stops sending traffic on the restoration path and issues one Back-off message to remove the restoration path The Normalization phase is complete (step 3073).

The second embodiment is two-ended restoration path signaling. In two-ended signaling, both an ingress OXC and an egress OXC initiate restoration independently upon detection of a signal failure alarm. Two restoration messages are initiated and forwarded towards each other and intersect between, or at either the ingress or egress OXC.

Two-ended signaling may complete restoration faster than one-ended signaling, but extra processing protocol is required over that required for one-ended signaling. The added protocol resolves contention in wavelength channel selection for the OXC where the two restoration processes intersect.

For two-ended signaling, when link C fails, both OXC 1 and OXC 4 detect a loss of light or a loss of frame, and initiate the restoration method on the restoration path. When the two restoration messages meet at some location on the restoration path, wavelength channel contention is resolved between the two ends of the restoration standby.

To resolve wavelength channel contention, a master/slave relationship is implemented for each restoration standby on the restoration path. Each restoration standby has two end OXCs, and one end OXC is designated master and the other end OXC as slave. Wavelength channel selection for each restoration standby is decided by the master OXC. Although the slave OXC may suggest a wavelength channel, the master OXC may overwrite the suggested wavelength channel.

For example, in a given restoration standby, if the lower OXC ID is designated as master and the higher OXC ID is designated slave, master OXC 1 (the ingress OXC) knows that the next regeneration OXC on the restoration path from the ingress end is OXC 6. OXC 1 selects a wavelength channel ID, for example wavelength channel x, on restoration standby OXC 1 to OXC 6, and forwards a restoration message to slave OXC 6, issues a cross-connect command to cross-connect the client port to wavelength channel x. Similarly, OXC 4 (the egress OXC) knows that the next regeneration OXC in the restoration path from the egress end is OXC 9. Master OXC 4 selects one wavelength channel ID, for example wavelength channel z, on restoration standby OXC 4 to OXC 9, and forwards a restoration message to slave OXC 9, and issues a cross-connect command to cross-connect the client port to the wavelength channel z.

When OXC 6 receives the restoration message from OXC 1, OXC 6 knows that the next regeneration OXC on the restoration path is OXC 9. For the OXC 6 to OXC 9 restoration standby, OXC 6 is the master. OXC 6 selects one wavelength channel ID, for example wavelength channel y, on restoration standby OXC 6 to OXC 9, and forwards a restoration message to slave OXC 9. At the same time, OXC 6 sends a cross-connect command to its ROADM core controller 107 with wavelength channels <x,y>. Its ROADM core controller 107 will use one regenerator to cross-connect the two wavelength channels <x,y> between restoration standbys OXC 1 to OXC 6 and OXC 6 to OXC 9.

When OXC 9 receives the restoration message from OXC 4, OXC 9 knows that the next regeneration OXC on the restoration path is OXC 6. For the OXC 9 to OXC 6 restoration standby, OXC 9 is the slave. OXC 9 may suggest one wavelength channel ID, for example wavelength channel z, on restoration standby OXC 9 to OXC 6, and forwards a restoration message to OXC 6. When OXC 6 receives the restoration message from OXC 9, OXC 6 knows it already selected wavelength channel y and forwarded a restoration message to OXC 9. OXC 6 ignores the restoration message from OXC 9. When OXC 9 receives the restoration message from OXC 6, it knows that OXC 6 is the master. Wavelength channel y overwrites wavelength channel z with wavelength channel y. OXC 9 accepts wavelength channel y on restoration standby OXC 9 to OXC 6 and wavelength channel z on restoration standby OXC 4 to OXC 9. OXC 9 then sends a cross-connect command to its ROADM core controller 107 with wavelength channel pair <y,z> to complete the restoration path.

Similar to one-ended signaling, for two-ended signaling, an OXC add/drop port detects a failure such as a loss of signal, loss of frame, etc., or performance threshold crossing of a connection at the point where it receives the signal from the OXC fabric (step 3075).

Two-ended signaling differs from one-ended signaling in response to a network failure. Upon receipt of the receive signal fault notification, the ingress and egress OXCs initiate restoration. After an alarm time-out period for the failed connection, the ingress and egress OXCs determine the failed connection ID and related information such as its restoration path, regenerator OXC locations, restoration priority and other information. The information is accessed from the ingress and egress OXCs' memory 115. The ingress OXC OXC 1 and egress OXC OXC 4 initiate the restoration method (step 3077, 3079). For a connection experiencing a two-way failure, this will occur at both ingress and egress OXCs independently.

The difference in two-ended signaling flow is that the ingress and egress end OXCs work independently and that two restoration methods progress independently from each service path connection and meet at a restoration standby on the restoration path. In one-ended signaling, over a given restoration standby, if the end OXC having a higher OXC ID selects a wavelength channel from high to low and the end OXC having a lower OXC ID selects a channel from low to high, wavelength channel contention occurs only when restoration capacity exhausts. In two-ended signaling, channel contention occurs when the independent restoration signaling from the ingress and egress OXCs meet.

When an X-connect message generated at each end OXC (steps 3081, 3083) is received at a regenerator OXC on the restoration path (steps 3085, 3087, 3089, 3091), the receiving OXC retrieves the restoration channel wavelength contained in the X-connect message.

When an X-connect message is received at a regenerator OXC over a restoration standby, two situations may be considered: (step 3093) (1) if the receiving OXC is the slave OXC in the restoration standby, it accepts the restoration wavelength channel contained in the X-connect message; or (2) if the receiving OXC is the master OXC, it may either accept the restoration wavelength channel contained in the X-connect message or select a new restoration wavelength channel over the restoration standby, and sends a Channel-Ack message back to the sending OXC with the chosen restoration wavelength channel of the restoration standby (step 3095).

Then the receiving OXC checks the next restoration standby along the restoration path. If the receiving OXC does not have an assigned restoration channel ID from the next restoration standby on the restoration path, which means the other restoration process has not reached here, then the receiving OXC checks its status for the next restoration standby (step 3097). If the receiving (present) OXC is the slave of the next restoration standby, meaning the next regenerator OXC is master, the receiving OXC forwards an X-connect message to the regenerator OXC of the next standby (which is master) with a suggested wavelength channel ID or empty channel (step 3099). But the present OXC (slave) does not issue a cross-connect command to its ROADM core controller 107 until a Channel-Ack message from the next regenerator OXC (master OXC) is received.

If the receiving (present) OXC is the master of the next restoration standby, meaning the next regenerator OXC is slave, the receiving OXC chooses one restoration wavelength channel ID for the next standby and forwards an X-connect message to the next regenerator OXC of the next standby (which is slave) (step 3101). The present OXC issues a cross-connect command to its ROADM core controller 107 with the previous standby wavelength channel and new selected channel (step 3103).

A slave OXC does not choose a wavelength channel ID, but forwards an X-connect message with a suggested wavelength channel ID. Upon receipt of an X-connect message by a master OXC from a slave OXC, the master OXC chooses a wavelength channel ID and forwards a Channel-Ack message that contains the chosen wavelength channel ID back to the slave OXC (step 3105).

A Channel-Ack message is high priority and is processed by a receiving OXC's 101 message processor 109. The purpose is to avoid idle time of an OXC ROADM core controller 107 because a slave OXC of a standby awaits a Channel-Ack message before cross-connect commands can be sent to its ROADM core controller 107. This problem is observed when many wavelength channel selection tasks are queued, especially at ingress and egress OXCs with many failed connections when the restoration method is initiated. When an OXC receives a Channel-Ack message over a restoration standby, that OXC must be the slave OXC of the restoration standby (steps 3107, 3109).

When the two X-connect messages meet at one common restoration standby on the restoration path, only the master end OXC of the common standby selects the wavelength channel. The slave end OXC of the restoration standby accepts the chosen wavelength channel. There is no channel contention. After the cross-connect commands are completed in both the master OXC and slave OXC, the restoration path is established.

Similar to one-end signaling, network component failure, resource overbooking, as well as software logic bugs may cause signaling messages and OXC commands to fail. When an OXC detects any restoration failure and OXC command failures, it issues a Back-off message along both directions of the restoration path to remove the restoration path (steps 3111, 3113, 3115 3117).

When a regenerator OXC 101 LRC 113 receives a Back-off message for a connection, it changes the status of any of its assigned wavelength channels to "available," changes the status of any of its assigned regenerators to "available," sends a disconnect command to disconnect its two assigned wavelength channels (or one assigned wavelength channel and an add/drop port if at the end) if a cross-connect command was issued, and forwards a Back-off message to the previous OXC in the restoration path if not at the end of the restoration path (steps 3119, 3121, 3123, 3125).

Normalization for two-ended signaling is the same as for one-ended signaling (steps 3063, 3065, 3067, 3069, 3071, 3073).

One or more embodiments of the present invention have been described. Nevertheless, it will be understood that various modifications may be made without departing from the spirit and scope of the invention. Accordingly, other embodiments are within the scope of the following claims.

What is claimed is:

1. A restoration signaling protocol for restoring service to a service path between an ingress end Optical cross-Connect (OXC) and an egress end OXC over a restoration path in a mesh network comprising:
   configuring an ingress end OXC to egress end OXC restoration path for the service path when the service path is provisioned;
   configuring restoration standbys for the restoration path wherein a restoration standby has one lightpath and each lightpath is assigned one wavelength channel;
   storing the restoration path at the ingress end and egress end OXCs;
   choosing a control OXC for the restoration path which may be the ingress end OXC or the egress end OXC defining an opposite end OXC;
   detecting a service path failure;
   initiating service path restoration comprising:
      accessing the restoration path at the control OXC;
      issuing a disconnect command at the control OXC disconnecting a client add/drop port from the service path wavelength channel;
      issuing a cross-connect command at the control OXC cross-connecting the client add/drop port for the service path to a first restoration standby wavelength channel;
      sending an X-connect message on the restoration path from the control OXC to a first restoration path regenerator OXC containing the first restoration standby wavelength channel;
      if the first regenerator OXC is not at the opposite end OXC,
         selecting a second restoration standby wavelength channel;
         issuing a cross-connect command cross-connecting the first restoration standby wavelength channel to the second restoration standby wavelength channel; and
         forwarding an X-connect message to a next regenerator OXC on the restoration path containing the second restoration standby wavelength channel;
      if the first regenerator OXC is at the opposite end OXC,
         issuing a disconnect command disconnecting a client add/drop port from the service path wavelength channel; and
         issuing a cross-connect command cross-connecting the first restoration standby wavelength channel to the client add/drop port at the opposite end OXC;
      if a cross-connect command at the control end OXC of the restoration path is not successful,
         sending a Back-off message in the direction of the opposite end OXC of the restoration path to remove the restoration path and release occupied restoration resources; and
      if a cross-connect command at the opposite end OXC of the restoration path is not successful,
         sending a Back-off message in the direction of the control end OXC of the restoration path to remove the restoration path and release occupied restoration resources.

2. The method according to claim 1 wherein if the cross-connect command is not successful and is not at the control end or the opposite end OXCs of the restoration path, sending Back-off messages in the directions of the control end OXC and opposite end OXC to remove the restoration path and release occupied restoration resources.

3. The method according to claim 1 wherein if a Back-off message is received at the opposite end or control end OXCs, issuing a disconnect command disconnecting a standby wavelength channel from a client add/drop port.

4. The method according to claim 2 wherein if a Back-off message is received at a regenerator OXC not at the control end or the opposite end OXCs, issuing a disconnect command disconnecting the two standby wavelength channels.

5. The method according to claim 1 wherein the X-connect message comprises a message identification (ID), a connection ID, a restoration path listing all disjoint restoration OXCs, restoration path regenerator OXCs, the sending OXC ID, the receiving OXC ID, the wavelength channel ID, the number of hops from a previous regenerator OXC, the distance from a previous regenerator OXC, the restoration priority and error information.

6. The method according to claim 1 wherein the Back-off message comprises a connection ID, a restoration path listing all restoration OXCs, restoration path regeneration location OXCs, the sending OXC ID, the receiving OXC ID, the wavelength channel ID and error information.

7. The method according to claim 1 further comprising:
repairing the service path failure;
informing the ingress end OXC that the service path is repaired;
forwarding a Normalization message from the ingress end OXC to the egress end OXC over the restoration path wherein the Normalization message comprises a connection ID, the sending OXC ID, the receiving OXC ID and error information; and
converting from the restoration path back to the service path.

8. A restoration signaling protocol for restoring service to a service path between an ingress end OXC and an egress end OXC over a restoration path in a mesh network from both the ingress end OXC and the egress end OXC comprising:
configuring an ingress end OXC to egress end OXC restoration path for the service path when the service path is provisioned;
configuring restoration standbys for the restoration path wherein a restoration standby has one lightpath and each lightpath is assigned one wavelength channel;
storing the restoration path at the ingress end and egress end OXCs;
detecting a service path failure;
initiating service path restoration comprising:
accessing the restoration path at the ingress end and egress end OXCs;
issuing a disconnect command at the ingress end OXC disconnecting a client add/drop port from the wavelength channel of the service path;
issuing a disconnect command at the egress end OXC disconnecting a client add/drop port from the wavelength channel of the service path;
for each restoration standby;
determining which OXC in a restoration standby is master and which OXC in the same restoration standby is slave, wherein the master OXC selects a restoration standby wavelength channel and the slave may suggest a restoration standby channel where the slave suggested wavelength channel may be overwritten by the master OXC;
sending an X-connect message on the restoration path from the ingress end OXC to a first restoration path regenerator OXC containing a first restoration standby wherein if the ingress end OXC is the master of the first restoration standby, issuing a cross-connect command cross-connecting the client add/drop port to the first restoration standby wavelength channel;
sending an X-connect message on the restoration path from the egress end OXC to a last restoration path regenerator OXC containing a last restoration standby wherein if the egress end OXC is the master of the last restoration standby, issuing a cross-connect command cross-connecting the client add/drop port to the last restoration standby wavelength channel;
determining if the receiving regenerator OXC is master or slave;
if master,
selecting one wavelength channel for the previous restoration standby and sending a Channel-Ack message to the slave OXC of the previous restoration standby with the selected wavelength channel;
if slave,
accepting the wavelength channel for the previous restoration standby;
if the receiving regenerator OXC has received an X-connect message from a next restoration standby, two restoration processes have met, wherein the receiving OXC issues a cross-connect command cross-connecting the wavelength channel for the received restoration standby to the wavelength channel for the next restoration standby;
if the receiving regenerator OXC has not received an X-connect message from a next restoration standby, determining if the receiving OXC is the master or the slave for the next restoration standby and if the receiving OXC is the master, selecting one wavelength channel for the next restoration standby and sending an X-connect message with the selected wavelength channel to the next (slave) regenerator OXC;
issuing a cross-connect command cross-connecting the wavelength channel for the previous restoration standby to the selected wavelength channel for the next restoration standby;
if a slave regenerator OXC,
sending an X-connect message with one empty or one suggested wavelength channel to a next (master) regenerator OXC;
waiting for a Channel-Ack message from the next master regenerator OXC;
receiving a Channel-Ack message from the next master regenerator OXC;
accepting the wavelength channel from the Channel-Ack message; and
issuing a cross-connect command to cross-connect the wavelength channel for the previous restoration standby to the wavelength channel for the next restoration standby;
if the X-connect message receiving OXC is the egress end OXC of the restoration path,
issuing a disconnect command disconnecting a client add/drop port from the service path wavelength channel; and
issuing a cross-connect command to cross-connect the wavelength channel for the previous restoration standby with the client add/drop port.

9. The method according to claim 8 wherein a regenerator OXC may be the master of one standby and the slave of another standby.

10. The method according to claim 8 further comprising:
repairing the service path failure;
informing the ingress end OXC that the service path is repaired; and
forwarding a Normalization message from the ingress end OXC to the egress end OXC over the restoration path; and converting from the restoration path back to the service path.

11. The method according to claim 8 wherein detecting a service path failure further comprises detecting a failure from an OXC at an OXC location via an Alarm Indication Signal (AIS) Line (AIS-L), or Path (AIS-P), loss of signal, loss of frame, or performance threshold crossing.

12. The method according to claim 8 wherein configuring a restoration path further comprises requiring that the restoration path be disjoint from its service path.

13. The method according to claim 8 wherein configuring a restoration standby further comprises:
creating the lightpath within optical reach; and
requiring a regenerator at each end of a standby to support each lightpath.

14. The method according to claim 13 wherein configuring a restoration standby is performed dynamically to share restoration standby wavelength channels and regenerators among multiple non-simultaneous failures.

15. The method according to claim 8 wherein if a cross-connect command is not successful,
at the egress end OXC:
sending a Back-off message in the direction of the ingress OXC to remove the restoration path and release occupied restoration resources;
at the ingress end OXC:
sending a Back-off message in the direction of the egress OXC to remove the restoration path and release occupied restoration resources; or
at a regenerator OXC that is neither the ingress nor egress end OXCs:
sending Back-off messages in the directions of the egress and ingress OXCs to remove the restoration path and release occupied restoration resources.

16. The method according to claim 15 wherein if a Back-off message is received at the ingress end OXC, issuing a disconnect command disconnecting a standby wavelength channel from a client add/drop port.

17. The method according to claim 15 wherein if a Back-off message is received at a regenerator OXC not at the ingress or egress end OXCs, issuing a disconnect command disconnecting the two standby wavelength channels.

18. The method according to claim 8 wherein the X-connect message comprises a message identification (ID), a connection ID, a restoration path listing all disjoint restoration OXCs, restoration path regenerator OXCs, the sending OXC ID, the receiving OXC ID, the wavelength channel ID, the number of hops from a previous regenerator OXC, the distance from a previous regenerator OXC, the restoration priority and error information.

19. The method according to claim 15 wherein the Back-off message comprises a connection ID, a restoration path listing all restoration OXCs, restoration path regeneration location OXCs, the sending OXC ID, the receiving OXC ID, the wavelength channel ID and error information.

20. The method according to claim 8 wherein the Channel-Ack (wavelength channel acknowledgement) message comprises includes a connection ID, the sending OXC ID, the receiving OXC ID and the wavelength channel ID.

21. The method according to claim 10 wherein the Normalization message comprises a connection ID, the sending OXC ID, the receiving OXC ID and error information.

* * * * *